United States Patent
Chelba et al.

(10) Patent No.: US 8,494,850 B2
(45) Date of Patent: Jul. 23, 2013

(54) SPEECH RECOGNITION USING VARIABLE-LENGTH CONTEXT

(75) Inventors: Ciprian I. Chelba, Palo Alto, CA (US); Peng Xu, San Jose, CA (US); Fernando Pereira, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/539,284

(22) Filed: Jun. 29, 2012

(65) Prior Publication Data

US 2013/0006623 A1   Jan. 3, 2013

Related U.S. Application Data

(60) Provisional application No. 61/503,334, filed on Jun. 30, 2011, provisional application No. 61/608,753, filed on Mar. 9, 2012.

(51) Int. Cl.
*G10L 15/20* (2006.01)

(52) U.S. Cl.
USPC .......................... 704/233; 704/251; 704/254

(58) Field of Classification Search
USPC ......................................... 704/233, 251, 254
See application file for complete search history.

(56) References Cited

U.S. PATENT DOCUMENTS

| | | | |
|---|---|---|---|
| 4,759,068 A | 7/1988 | Bahl et al. | |
| 4,817,156 A | 3/1989 | Bahl et al. | |
| 4,819,271 A | 4/1989 | Bahl et al. | |
| 5,033,087 A * | 7/1991 | Bahl et al. | 704/256.5 |
| 5,268,990 A * | 12/1993 | Cohen et al. | 704/200 |
| 5,502,791 A | 3/1996 | Nishimura et al. | |
| 5,625,749 A * | 4/1997 | Goldenthal et al. | 704/254 |
| 5,679,001 A | 10/1997 | Russell et al. | |
| 5,729,656 A | 3/1998 | Nahamoo et al. | |
| 5,758,024 A | 5/1998 | Alleva | |
| 5,839,105 A * | 11/1998 | Ostendorf et al. | 704/256 |
| 5,937,384 A | 8/1999 | Huang et al. | |
| 5,953,701 A * | 9/1999 | Neti et al. | 704/254 |
| 6,038,533 A * | 3/2000 | Buchsbaum et al. | 704/260 |
| 6,141,641 A * | 10/2000 | Hwang et al. | 704/243 |
| 6,151,575 A | 11/2000 | Newman et al. | |
| 6,243,680 B1 | 6/2001 | Gupta et al. | |
| 7,035,789 B2 | 4/2006 | Abrego et al. | |

(Continued)

OTHER PUBLICATIONS

Brants et al. "Large language models in machine translation," *Proceedings of the 2007 Joint Conference Empirical Methods in Natural Language Processing and Computational Natural Language Learning (EMNLP-CoNLL)*, 2007, 858-867 (10 pages).

(Continued)

*Primary Examiner* — Michael N Opsasnick
(74) *Attorney, Agent, or Firm* — Fish & Richardson P.C.

(57) ABSTRACT

Methods, systems, and apparatus, including computer programs encoded on a computer storage medium, for recognizing speech using a variable length of context. Speech data and data identifying a candidate transcription for the speech data are received. A phonetic representation for the candidate transcription is accessed. Multiple test sequences are extracted for a particular phone in the phonetic representation. Each of the multiple test sequences includes a different set of contextual phones surrounding the particular phone. Data indicating that an acoustic model includes data corresponding to one or more of the multiple test sequences is received. From among the one or more test sequences, the test sequence that includes the highest number of contextual phones is selected. A score for the candidate transcription is generated based on the data from the acoustic model that corresponds to the selected test sequence.

18 Claims, 8 Drawing Sheets

U.S. PATENT DOCUMENTS

| | | | |
|---|---|---|---|
| 7,085,720 | B1 | 8/2006 | Gorin et al. |
| 7,113,903 | B1 | 9/2006 | Riccardi et al. |
| 7,444,282 | B2 | 10/2008 | Choo et al. |
| 7,447,635 | B1 | 11/2008 | Konopka et al. |
| 7,467,087 | B1 * | 12/2008 | Gillick et al. ................. 704/260 |
| 7,650,331 | B1 | 1/2010 | Dean et al. |
| 2002/0040296 | A1 * | 4/2002 | Kienappel ..................... 704/220 |
| 2002/0087314 | A1 | 7/2002 | Fischer et al. |
| 2002/0087317 | A1 | 7/2002 | Lee et al. |
| 2003/0110035 | A1 | 6/2003 | Thong et al. |
| 2004/0088163 | A1 | 5/2004 | Schalkwyk |
| 2005/0256715 | A1 | 11/2005 | Okimoto et al. |
| 2006/0020461 | A1 | 1/2006 | Ogawa |
| 2006/0031069 | A1 | 2/2006 | Huang et al. |
| 2006/0116997 | A1 | 6/2006 | Yu et al. |
| 2008/0262828 | A1 | 10/2008 | Och et al. |
| 2008/0281857 | A1 | 11/2008 | Dymetman |
| 2010/0070263 | A1 | 3/2010 | Goto et al. |
| 2010/0070277 | A1 | 3/2010 | Arakawa et al. |

OTHER PUBLICATIONS

Brants et al., "Distributed language models," in *HLT-NAACL (Tutorial Abstracts) '09*, 2009, pp. 3-4 (2 pages).

Chang et al., "Bigtable: A distributed storage system for structured data," *ACM Transactions on Computer Systems (TOCS)*, 2008, 26(2):1-26 (28 pages).

Chelba et al., "Distributed acoustic modeling with back-off n-grams," in Proceedings of ICASSP, Kyoto, Japan, Mar. 2012, pp. 4129-4132. (4 pages).

Chelba et al., "Query language modeling for voice search," in *Spoken Language Technology Workshop (SLT)*, 2010, 127-132 (6 pages).

Coxhead, "A Glossary of Linguistic Terms," University of Birmingham, School of Computer Science www.cs.bham.ac.uk/~pxc/nlpa/nlpgloss.html (accessed Jun. 7, 2012) (16 pages).

Dean et al., "MapReduce: simplified data processing on large clusters," *Commun. ACM*, 2008, 51:107-113 (10 pages).

Gales et al., "Progress in the CU-HTK broadcast news transcription system," *Audio, Speech, and Language Processing, IEEE Transactions on*, 2006, 14(5):1513-1525 (16 pages).

Gales, "Semi-tied covariance matrices for hidden markov models," *IEEE Transactions in Speech and Audio Processing*, 1999, 7:272-281 (10 pages).

Halevy et al., "The unreasonable effectiveness of data," *IEEE Intelligent Systems*, 2009, 24(2):8-12 (5 pages).

Kim et al., "Recent advances in broadcast news transcription," *Automatic Speech Recognition and Understanding, ASRU'03. IEEE Workshop on. IEEE*, 2003, pp. 1-6 (8 pages).

Mohri et al., "Weighted finite-state transducers in speech recognition," *Computer Speech & Language*, 2002, 16(1):69-88 (27 pages).

Povey et al., "Boosted MMI for model and feature space discriminative training," in *Proceedings of ICASSP*, 2008, pp. 1-4 (4 pages).

Schwartz et al., "Improved Hidden Markov modeling of phonemes for continuous speech recognition," in *Proceedings of ICASSP*, 1984, 9:21-24 (4 pages).

Vitter, "Random sampling with a reservoir," *ACM Transactions on Mathematical Software (TOMS)*, 1985, 11(1):37-57 (21 pages).

Watanabe et al., "Variational bayesian estimation and clustering for speech recognition," *IEEE Transactions on Speech and Audio Processing*, 2004, 12(4):365-381 (17 pages).

Young et al., "The HTK Book," Cambridge University Engineering Department, Cambridge, England, Mar. 2009, 384 pages.

Young et al., "Tree-based state tying for high accuracy acoustic modeling," in *Proceedings ARPA Workshop on Human Language Technology*, 1994, 307-312 (6 pages).

Kovacek, David M., "Non-Final Office Action" in U.S. Appl. No. 13/539,225, United States Patent & Trademark Office, Oct. 3, 2012, 26 pages.

Niesler, T.R. and P.C. Woodland. 'Variable-length category-based n-grams for language modelling', Technical report CUED/FINFENG/TR.215, Department of Engineering, University of Cambridge, U.K., Apr. 1995.

"Vector Quantization" Data-Compression.com, a website devoted to the principles and practice of data compression, 6 pages, http://www.data-compression.com/vq.html (accessed Aug. 2012).

Reynolds, D. A., "Gaussian Mixture Models, Encyclopedia of Biometric Recognition," Springer (2008). 5 pages http://www.ll.mit.edu/mission/communications/ist/publications/0802_Reynolds_Biometrics-GMM.pdf.

Zweig, Geoffrey et al., "Continuous Speech Recognition with a TF-IDF Acoustic Model," Interspeech 2010, 4 pages, http://research.microsoft.com/pubs/131332/tfidf_am.pdf.

Novotney, Scott et al., "Unsupervised Acoustic and Language Model Training With Small Amounts of Labelled Data," IEEE International Conference on Acoustics, Speech and Signal Processing, 2009 (ICASSP 2009.), 4 pages http://old-site.clsp.jhu.edu/people/snovotne/papers/novotney_icassp09.pdf.

Gauvain, J.L. et al., "Developments in Continuous Speech Dictation using the ARPA WSJ Task," Proc. IEEE ICASSP-95, 1995, 4 pages, ftp://192.44.78.170/public/ica95lv.pdf.

Banjeree, Pratyush et al., "Application of Triphone Clustering in Acoustic Modeling for Continuous Speech Recognition in Bengali," 19th International Conference on Pattern Recognition, 2008. (ICPR 2008), 4 pages.

Notification of Transmittal of the International Search Report and The Written Opinion of the International Searching Authority, or the Declaration issued in PCT/IS2012/045039 on Dec. 18, 2012, 11 pages.

Rybach, David et al, "Advances in Arabic Broadcast News Transcription at RWTH", Automatic Speech Recognition & Understanding, 2007. ASRU. IEEE Works Hop on, IEEE, PI,Dec. 1, 2007, pp. 449-454.

Popescu, Vladimir et al, "Parallel training algorithms for continuous speech recognition, implemented in a message passing framework", 14th European Signal Processing Conference (EUSIPCO 2006), Sep. 8, 2006, pp. 1-5, Florence, Italy, Retrieved from the Internet on Dec. 7, 2012: URL:http://www.eurasip.org/Proceedings/Eusipco/Eusipco2006/papers/1568981978.pdf, 4 pages.

Kovacek, David M., "Final Office Action" in U.S. Appl. No. 13/539,225, United States Patent & Trademark Office, Mar. 29, 2013, 35 pages.

* cited by examiner

SPEECH RECOGNITION USING VARIABLE-LENGTH CONTEXT

CROSS-REFERENCE TO RELATED APPLICATIONS

This application claims the benefit of U.S. patent application Ser. No. 61/503,334, filed on Jun. 30, 2011, and of U.S. patent application Ser. No. 61/608,753, filed on Mar. 9, 2012. The contents of both applications are incorporated herein by reference in their entirety.

BACKGROUND

Speech recognition systems use acoustic models to transcribe utterances. Acoustic models are often trained using a set of training data that include recorded utterances. Typically, acoustic models include statistical data about the sounds that make up utterances in the training data.

SUMMARY

Distributed computing techniques can be used to train an acoustic model. The data used to train the acoustic model can include sequences of phonetic elements that each represent different phonetic contexts. Data identifying the sequences can be distributed to multiple processing modules that are each assigned to train a different portion of the acoustic model. To facilitate training of the acoustic model, data for sequences that include a common sequence of phonetic elements can be transmitted to the same processing module, permitting the processing module to efficiently train the assigned portion of the acoustic model.

One innovative aspect of the subject matter described in this specification is embodied in methods that include the actions of: receiving speech data and a transcription for the speech data; accessing a phonetic representation for the transcription; extracting training sequences from the phonetic representation for a particular phone in the phonetic representation, each of the training sequences including a different set of contextual phones surrounding the particular phone; identifying a partitioning key based on a sequence of phones that occurs in each of the training sequences; selecting, from among a plurality of processing modules, a processing module to which the identified partitioning key is assigned, the processing module being designated to train a portion of an acoustic model that corresponds to the identified partitioning key; and transmitting, to the selected processing module, (i) data identifying the training sequences and (ii) a portion of the speech data that corresponds to the training sequence that includes the most contextual phones.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, accessing the phonetic representation for the transcription includes accessing a phonetic representation including context-independent phones. Receiving speech data includes receiving feature vectors that indicate speech characteristics. Transmitting at least a portion of the speech data includes transmitting a speech data instance for fewer than all of the training sequences in the set of training sequences. Transmitting the at least a portion of the speech data includes transmitting the speech data corresponding to the training sequence that includes the most contextual phones, without transmitting additional speech data for the other training sequences to the selected processing module. Receiving, at the selected processing module, the data identifying the training sequences and the portion of the speech data that corresponds to the training sequence that includes the most contextual phones. Accessing, at the selected processing module, a different subset of the received speech data for each of the training sequences. Identifying the partitioning key based on the sequence of phones that occurs in each of the training sequences includes identifying the partitioning key based on a sequence of two or more consecutive phones that occurs in each of the training sequences. Identifying the partitioning key based on the sequence of phones that occurs in each of the training sequences includes identifying the partitioning key based on a sequence that includes one contextual phone before the particular phone and one contextual phone after the particular phone. Identifying the partitioning key based on the sequence of phones that occurs in each of the training sequences includes identifying a partitioning key for each of the training sequences, where the same partitioning key is identified for each of the training sequences.

These and other embodiments may each optionally include one or more of the following features. For instance, the training sequences are first training sequences that each include a central triphone. Identifying the partitioning key based on the sequence of phones that occurs in each of the training sequences includes identifying the partitioning key based on the central triphone included in the first training sequences. Transmitting, to the processing module and not to any of the other processing modules in the plurality of processing modules, data identifying second training sequences including the same central triphone included in the first training sequences, the second training sequences being extracted from a phonetic representation for a transcription for second speech data. Extracting the training sequences for the particular phone in the phonetic representation includes identifying at least a first sequence that includes one contextual phone before the particular phone or one contextual phone after the particular phone, a second sequence that includes two contextual phones before the particular phone or two contextual phones after the particular phone, and a third sequence that includes three contextual phones before the particular phone or three contextual phones after the particular phone. Extracting the training sequences for the particular phone in the phonetic representation includes extracting sequences of consecutive phones in the phonetic representation.

These and other embodiments may each optionally include one or more of the following features. For instance, receiving, at the selected processing module, the data identifying the training sequences. Aggregating, at the selected processing module, the portion of the speech data with speech data for other instances of the training sequences. Generating, at the selected processing module, a model for a first training sequence of the training sequences based on the aggregated speech data for first the training sequence. Storing the generated model in a distributed associative array, the generated model being stored in a partition of the distributed associative array being associated with the identified partitioning key. Generating the model for the first training sequence includes generating a context-dependent Gaussian mixture model dependent on the sequence of contextual phones included in the first training sequence, the Gaussian mixture model representing the output distribution of a hidden Markov model state of a central phone of the first training sequence. Storing the generated model in the distributed associative array includes storing the generated model in the distributed associative array such that the generated model is associated with a key that uniquely corresponds to the first training sequence. Determining, at the selected processing module, that the aggregated speech data includes data for fewer than a threshold number of instances of a second training sequence of the training sequences, and in response to determining that the aggregated speech data includes data for fewer than the threshold number of instances of the second training sequence, not generating a model for the second training sequence.

Another innovative aspect of the subject matter described in this specification is embodied in methods that include the actions of: receiving speech data and data indicating a candidate transcription for the speech data; accessing a phonetic representation for the candidate transcription; extracting, from the phonetic representation, multiple test sequences for a particular phone in the phonetic representation, each of the multiple test sequences including a different set of contextual phones surrounding the particular phone; receiving data indicating that an acoustic model includes data corresponding to one or more of the multiple test sequences; selecting, from among the one or more test sequences for which the acoustic model includes data, the test sequence that includes the highest number of contextual phones; accessing data from the acoustic model corresponding to the selected test sequence; and generating a score for the candidate transcription based on the accessed data from the acoustic model that corresponds to the selected test sequence.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, selecting the test sequence that includes the highest number of contextual phones includes selecting one of the test sequences that includes fewer than a predetermined maximum number of contextual phones. Generating the score for the candidate transcription based on the accessed data from the acoustic model that corresponds to the selected test sequence includes: determining a penalty based on the selected test sequence including fewer than the predetermined maximum number of contextual phones; and adjusting a first score for the candidate transcription based on the penalty to generate an adjusted score, the adjusted score indicating a lower likelihood than the first score that the candidate transcription is an accurate transcription for the speech data. Determining the penalty based on the selected test sequence including fewer than the predetermined maximum number of contextual phones includes determining a magnitude of the penalty based on a difference between a number of contextual phones in the selected test sequence and the predetermined maximum number of contextual phones.

These and other embodiments may each optionally include one or more of the following features. For instance, extracting multiple test sequences for the particular phone includes extracting one or more asymmetric test sequences that include asymmetric numbers of contextual phones before and after the particular phone. Extracting multiple test sequences for the particular phone includes extracting one or more symmetric test sequences that include symmetric numbers of contextual phones before and after the particular phone, each of the symmetric test sequences each including fewer contextual phones than each of the one or more asymmetric test sequences. Extracting multiple test sequences for the particular phone includes extracting at least: a first sequence that includes one contextual phone before the particular phone or one contextual phone after the particular phone, a second sequence that includes two contextual phones before the particular phone or two contextual phones after the particular phone, and a third sequence that includes three contextual phones before the particular phone or three contextual phones after the particular phone. Extracting multiple test sequences for the particular phone includes extracting at least five test sequences, where the at least five test sequences respectively include any contextual phones occurring within one, two, three, four, or five contextual positions before and after the particular phone.

These and other embodiments may each optionally include one or more of the following features. For instance, receiving data indicating that the acoustic model includes data for the one or more of the multiple test sequences includes: requesting, for each of the test sequences, data from the acoustic model that corresponds to the test sequence; receiving data from the acoustic model corresponding to each of the one or more test sequences for which data is present in the acoustic model; and determining that the one or more test sequences are recognized by the model based on receiving the data corresponding to the one or more test sequences. Accessing the data from the acoustic model corresponding to the selected test sequence includes: identifying a partitioning key based on a sequence of phones that occurs in each of the multiple test sequences; identifying a partition of a distributed associative array that corresponds to the partitioning key; and obtaining, from the identified partition, data corresponding to each of the multiple test sequences for which the acoustic model includes data. Accessing the data from the acoustic model corresponding to the selected test sequence includes accessing data that describe a Gaussian mixture model corresponding to a central phone of the selected test sequence. Accessing the phonetic representation for the transcription includes accessing a phonetic representation including context-independent phones. Receiving the speech data includes receiving feature vectors that indicate speech characteristics. Generating the score for the candidate transcription based on the accessed data from the acoustic model that corresponds to the selected test sequence includes adjusting a score assigned to the candidate transcription using a different acoustic model.

These and other embodiments may each optionally include one or more of the following features. For instance, the operations performed can include: extracting, from the phonetic representation, multiple second test sequences for a second phone in the phonetic representation that is different from the particular phone, each of the multiple second test sequences including a different set of contextual phones surrounding the second phone; receiving data indicating that the acoustic model includes data for one or more of the multiple second test sequences; and selecting, from among the one or more second test sequences for which the acoustic model includes data, the second test sequence that includes the highest number of contextual phones. Generating the score for the candidate transcription includes generating the score for the candidate transcription based on the data from the acoustic model that corresponds to the selected test sequence and the data from the acoustic model that corresponds to selected second test sequence.

Advantageous implementations can include one or more of the following features. An acoustic model that recognizes phonetic contexts of many varying sizes can be trained. The training process for the acoustic model can use large amounts of input data. The accuracy of an acoustic model can be enhanced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
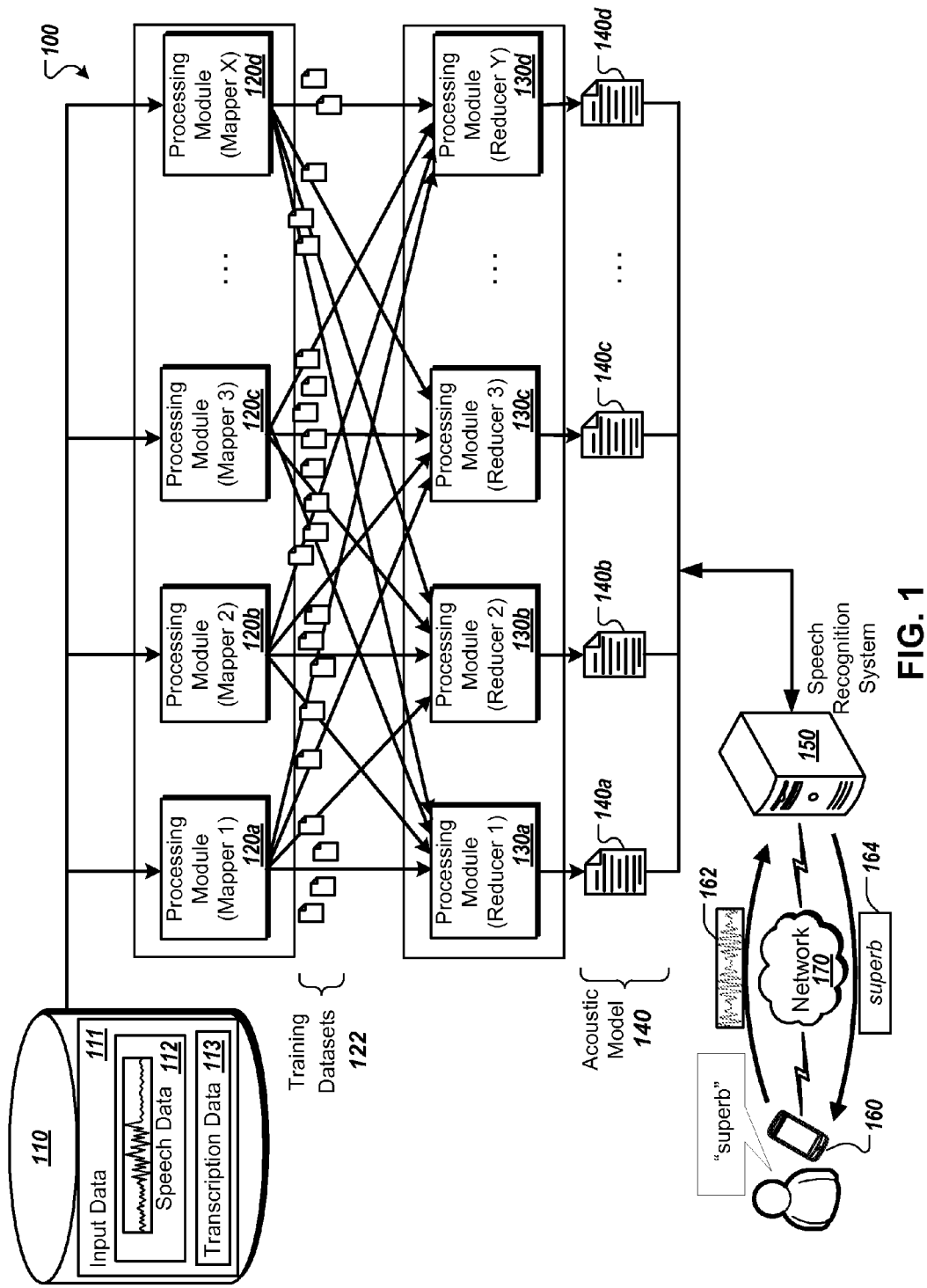
FIG. 1 is a diagram that illustrates an example of a system for training an acoustic model.

An acoustic model can be used to assign a score to an acoustic frame using sub-word modeling units (e.g., phones) that are context dependent. The scores produced by the acoustic model can be used to identify a transcription for a set of acoustic frames, or to evaluate the likelihood that a particular transcription is correct. In some implementations, the sub-word modeling units, or phones, are each modeled by a Hidden Markov model (HMM), typically having three states. Each state can assign a likelihood score to one or more multi-dimensional acoustic frames using a Gaussian Mixture Model (GMM). Typically, each mixture component of a GMM uses a diagonal covariance matrix.

As described further below, an acoustic model can be trained using a variety of phonetic contexts of differing lengths. For example, the acoustic model can be trained with training sequences that respectively include one, two, three, or more phones before and/or after a central phone.

Many typical acoustic models are trained using use between 100 and 1000 hours of training data. Typical training processes are often unable to make advantageous use of more than 1000 hours of training data. In addition, the computational expense of processing a larger amount of training data is impractical for many training methods. However, using the techniques described below, an acoustic model can be trained using several thousand hours of training data, tens of thousands of hours of training data, a hundred thousand hours of training data, or more. The distributed computing framework described below can facilitate the processing required to use large training data sets.

Additionally, typical acoustic models generally include fewer than one million Gaussians. In some implementations, an acoustic model trained as described below can include more than one million Gaussians, or more than ten million Gaussians, as components of various GMMs. These Gaussians can be used to model context-dependent HMM states for a large number of contexts, thus making advantageous use of the large variety of contexts presented in a large sets of training data. The acoustic model includes GMMs for many different variations of contexts, including contexts of different lengths. As a result, the techniques described below can provide acoustic models that include context-dependent GMMs for larger and more varied amounts of context than is stored in typical acoustic models. In some instances, the larger and more varied sets of context-dependent GMMs in the acoustic models described below can result in higher speech recognition accuracy than is achieved using typical acoustic models.

Distributed computing techniques can be used to train the acoustic model (e.g., to update an existing acoustic model or create a new acoustic model). In a distributed computing system, different processing modules are assigned to train different portions of the acoustic model. Each of the processing modules is assigned one or more partitioning keys that correspond to the portion of the acoustic model to be trained.

In the distributed system, speech data and a transcription for the speech data can be received. A phonetic representation for the transcription can be accessed, and training sequences can be extracted from the phonetic representation. The training sequences can include sequences that include a different set of contextual phones surrounding a particular phone in the phonetic representation. A partitioning key is identified based on a sequence of phones that occurs in each of the training sequences, such as a central sequence of three phones that occurs in each training sequence. Based on the partitioning key, a processing module is selected from a plurality of processing modules. Data identifying the training sequences and data identifying a portion of the speech data are transmitted to the selected processing module. The selected processing module can use the received data to train (e.g., update or generate) a portion of the acoustic model that is associated with the partitioning key.

FIG. 1 is a diagram that illustrates an example of a system 100 for training an acoustic model. The system 100 includes a number of processing modules, some of which are referred to as mappers 120a-120d and others referred to as reducers 130a-130d. The mappers 120a-120d access input data from one or more data storage devices 110, and generate related key-value pairs, which are illustrated as training datasets 122. The reducers 130a-130d each receive different subsets of the key-value pairs, and use the received data to generate or update an acoustic model 140. After training, the acoustic model 140 can be used by a speech recognition system 150 to generate transcriptions for speech. For example, the speech recognition system 150 can receive speech data from, and provide transcriptions to, a computing device 160 over a network 170.

The computing device 160 can be, for example, a desktop computer, a laptop computer, a cellular phone, a smartphone, a personal digital assistant (PDA), a tablet computer, a wearable computer, a navigation system, or another computing device. The operations performed by the speech recognition system 150 can be performed by individual computer systems or can be distributed across multiple computer systems. The speech recognition system accesses the acoustic model 140, stored on one or more data storage devices, which can be connected directly or over the network 170. The network 170 can be wired or wireless or a combination of both. The network 170 can include one or more public or private networks, and can include the Internet.

The processing modules in the system 100 can use the MapReduce process to perform the distributed training of the acoustic model 140. In this process, the mappers 120a-120d each perform map operations on different sets of input data, producing key-value pairs as map output. The key-value pairs are sent to the reducers 130a-130d, which combine values associated with the same key to produce a final output value for each key. Each reducer 130a-130d may be responsible for a different non-overlapping subset of the overall set of keys. In other words, each key may be assigned to a single reducer 130a-130d, so that data associated with the same key is processed by the same reducer 130a-130d. The distribution of data from the mappers 120a-120d to the reducers 130a-130d may be referred to as shuffling, and may result in each reducer receiving, from each mapper, the key-value pairs for which the reducer is responsible.

In further detail, the input data 111 used to train the acoustic model 140 includes speech data 112 and transcription data 113. The speech data 112 can include recorded audio that include utterances and/or data describing utterances, such as feature vectors that describe speech characteristics. In some implementations, hundreds, thousands, or tens of thousands of hours of speech samples are used to train the acoustic model 140. The transcription data 113 can include transcriptions for the utterances included in the speech data 112. In some implementations, the speech data 112 and the corresponding transcription data 113 used to train the acoustic model 140 are selected so that the transcriptions have at least a minimum confidence level. For example, a speech sample can be selected for use in training when a confidence score for the corresponding transcription indicates that a speech recognizer has at least a minimum confidence (e.g., 70%, 80%, or 90%) in the transcription.

Different portions of the input data 111 are processed by different mappers 120a-120d. In some implementations, input data 111 can be organized into portions or "chunks" of data, and each mapper 120a-120d processes different portions of the input data 111. In some implementations, the system 100 can include one or more master processing modules (not shown) which assign and/or track the portions of the input data 111 that are processed by each mapper 120a-120d.

Based on the input data 111, the mappers 120a-120d generate key-value pairs as mapper outputs, where each key-value pair identifies a training sequence for training the acoustic model 140. Groups of related key-value pairs are illustrated as datasets 122. Nevertheless, each key-value pair can be transmitted independently to a reducer 130a-130d. A dataset 122 can include, for example, key-value pairs that each identify a training sequence with different amount of phonetic context around a particular phone in a particular instance of an utterance. The key-value pairs in each dataset 122 identify related training sequences that have particular characteristics in common, such as a central sequence of phones that occurs in each of the related training sequences.

The mappers 120a-120d output the key-value pairs in the datasets 122, and the key-value pairs are distributed to the various reducers 140a-140b in a shuffling phase. As described further below, the partitioning keys used for shuffling are defined so that each key-value pair in a given dataset 122 is transmitted to the same reducer 130a-130d. For example, the partitioning key associated with a training sequence can be based on a central sequence of phones in the training sequence. Because each related training sequence has the same central sequence, each key-value pair is associated with the same partitioning key, and is thus assigned to the same reducer 130a-130d (e.g., the reducer assigned to handle data associated with that partitioning key).

Each reducer 130a-130d is assigned one or more partitioning keys, and receives all of the key-value pairs associated with its assigned one or more partitioning keys. In some implementations, each partitioning key is assigned to exactly one reducer 130a-130d, so that the key-value pairs in each dataset 122 are transmitted to, and processed by, a single reducer 130a-130d. Each reducer 130a-130d is responsible for generating a particular partition 140a-140d of the acoustic model 140 that corresponds to its assigned one or more partitioning keys. Based on the key-value pairs that each reducer 130a-130d receives, each reducer 130a-130d aggregates training sequences and trains the assigned partition 140a-140d of the acoustic model 140 (e.g., by statistical analysis of the aggregated data for each assigned partitioning key). The acoustic model partitions 140a-140d, which store the reducer outputs, can be segments of a distributed (e.g., partitioned) associative array.

After training of the acoustic model 140, the speech recognition system 150 can access data in the acoustic model 140 using the same partitioning keys used to train the acoustic model 140. When audio data 162 is received from a computing device 160, the speech recognition system 150 can evaluate candidate transcriptions (e.g. hypotheses) for the audio data 162 using the acoustic model 140. For a given candidate transcription, a set of partitioning keys can be selected based on the phonetic characteristics of the candidate transcription. Acoustic model data that is associated with the selected partitioning keys is then retrieved from the associative array. Data for each partitioning key can be obtained from the partition 140a-140d that was trained by the reducer 130a-130d assigned that partitioning key during training of the acoustic model 140. The speech recognizer system 150 uses the acoustic model data to assess the likelihood that the candidate transcription is correct. The speech recognizer system 150 then provides to the computing device 160 one or more hypotheses 164 determined most likely to be correct transcriptions of the audio data 162.

Figure 2:
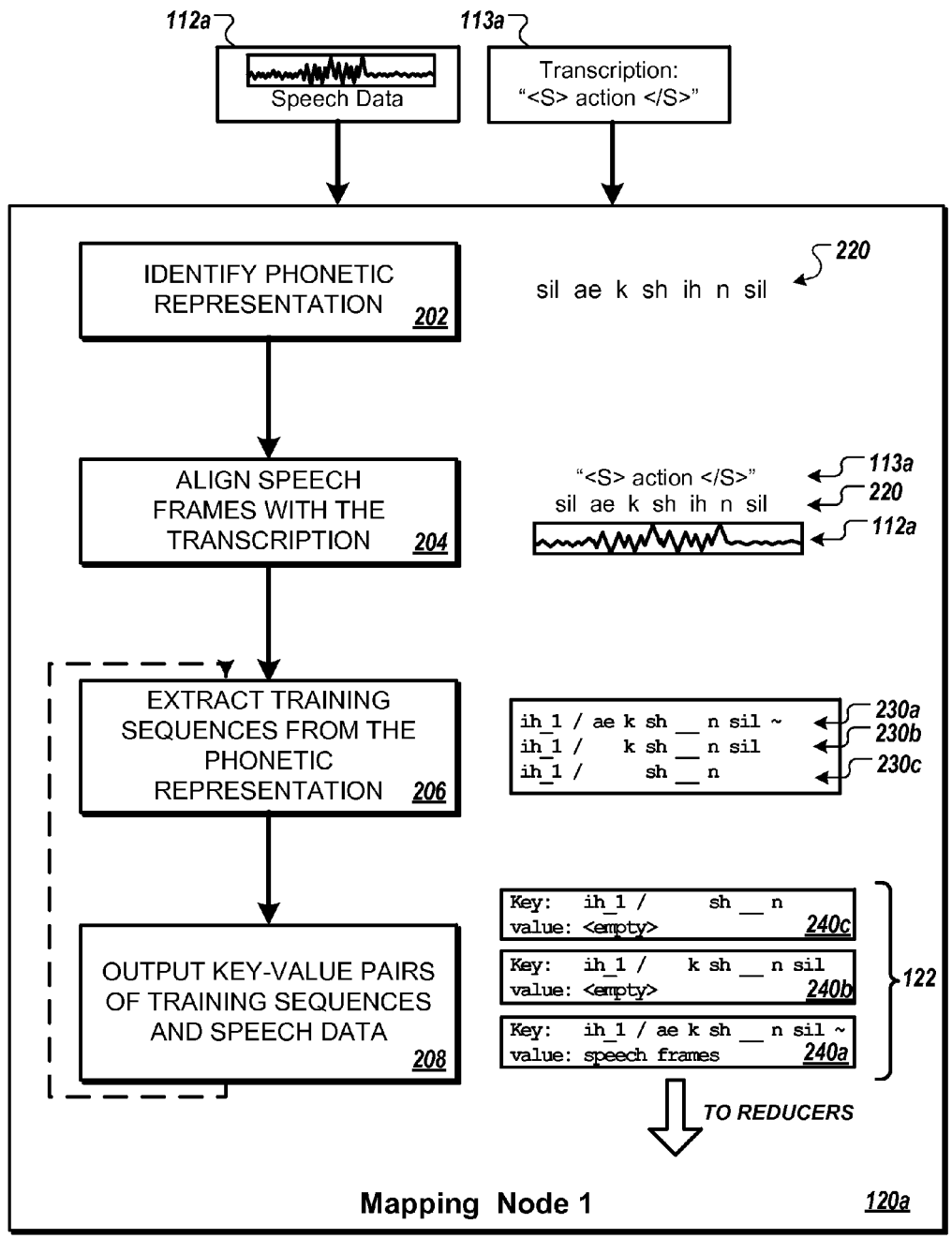
FIG. 2 is a diagram illustrating an example of processing performed by a mapper processing module.

FIG. 2 is a schematic diagram illustrating an example of processing performed by a mapper processing module. As an example, the mapper 120a of FIG. 1 is illustrated processing a particular input to generate one of the training datasets 122. Each of the mappers 120a-120d can perform similar processing with other input data to generate other datasets 122. Each mapper 120a-120d can perform processing on word-level segments of sample speech data, in the manner described below.

The mapper 120a of FIG. 1 accesses speech data 112a for particular utterance, such as a voice query submitted by a user. The mapper 120a also accesses data that identifies a transcription 113a for the speech data 112a, which in the illustrated example, indicates that the transcription 113a includes the term "action." In some implementations, the mapper 120a receives chunks of input data that each include multiple records. Each record can include the audio waveform for the utterance, the word-level transcription for the utterance, and other elements.

In some implementations, to avoid training the acoustic model 140 with erroneous data, the mapper 120a ensures that a minimum threshold confidence score for the transcription is met, which indicates that the transcription is likely to be correct. When a transcription does not meet the minimum confidence threshold, the transcription and associated data are not processed further, and the mapper proceeds to process other input data.

The mapper 120a identifies a phonetic representation 220 for the transcription 113a (202). From a pronunciation lexicon, the mapper 120 can obtain a mapping of the transcription 113a to a sequence of phonetic elements, such as context-independent (CI) phones, that represent a pronunciation of the transcription 113a. For example, for the word "<S>action</S>," the phonetic representation 220 "sil ae k sh ih n sil" is obtained. The symbols "<S>" and "</S>" denote sentence boundaries, which are pronounced as long silences, indicated as "sil" in the phonetic representation 220. In some implementations, the CI-phones can be augmented with word boundary symbols, which occupy their own positions in phonetic representations.

The mapper 120a aligns the phonetic representation 220 with the transcription 113a (204). For example, the mapper 120a generates context-dependent-state level Viterbi alignment between speech frames of the speech data 112a and the transcription 113a. The alignment can be obtained using H ∘C ∘L, where L, C, and H respectively denote the pronunciation lexicon, a context dependency tree, and HMM-to-state finite state transducers (FSTs). In some implementations, alignment involves identifying the speech frames that correspond to each context-dependent HMM state in the phonetic representation, where the context is the current phone and surrounding phones. Alignment can include determining the beginning and ending time indexes of audio data correspond to each HMM state of each phone.

The mapper 120a extracts training sequences 230a-230c from the phonetic representation 220 (206). Each training sequence 230a-230c is referred to as an M-phone, a modeling unit that identifies a sequence of phones. M denotes an integer number of contextual phones surrounding a central phone in the sequence. Each training sequence 230a-230c or M-phone describes a different contiguous segment of acoustic features corresponding to a context-dependent HMM state. Each training sequence 230a-230c can include different set of contextual phones from a contiguous portion of the phonetic representation 220.

M-phones having different values of M include different numbers of contextual phones extending to the left and right of a central phone from the phonetic representation 220. As an example, a $5^{th}$-order M-phone (e.g., a 5-phone) includes 5 phones preceding a central phone and 5 phones following the central phone, thus describing a sequence of 11 consecutive phones in the phonetic representation 220. As another example, a $3^{rd}$-order M-phone (e.g., a 3-phone) includes 3 phones preceding a central phone and 3 phones following the central phone, therefore describing a sequence of 7 phones. A $1^{st}$-order M-phone (or 1-phone) includes a total of three phones, and is therefore referred to as a "triphone" (which is different from a 3-phone, which is 7 phones in length). M-phones can be extracted for any integer value of M when the phonetic representation 220 is sufficiently long.

To extract a set of training sequences 230a-230c, the mapper 120a selects a central phone, which represents a central position that each training sequence 230a-230c is centered on. For the central phone, the mapper 120a extracts M-phones for values of M that range from 1 to a predetermined maximum value. The maximum value identifies the highest-order M-phone to be extracted. The maximum value of M can be, for example, 3, 4, 5, or 7, or another value of M. In some implementations, the maximum value of M can be consistent for all mappers 120a-120d and for all input data when generating the acoustic model 140.

The mapper 120a extracts the M-phone for the maximum value of M, and the mapper 120a also extracts "back-off" M-phones that each include fewer contextual phones. From the maximal order M-phone (e.g. the M-phone that includes the largest number of contextual phones), the mapper 120a extracts M-phones with lower values of M, until the $1^{st}$-order M-phone (the triphone) is extracted. For example, if the maximum value of M is 5, the back-off M-phones are the 4-phone, 3-phone, 2-phone, and 1-phone.

In the illustrated example, each training sequence 230a-230c is a different M-phone centered on the same central phone "ih." The mapper 120a uses "3" as a maximum value of M, indicating that a maximum of 3 contextual phones before and after the central phone, "ih," are to be used in generating the acoustic model 140. A total of 3 M-phones are extracted (e.g., M-phones for the set M={1, 2, 3}). The maximal order M-phone in the set—the M-phone that includes the most phones—is the training sequence 230a, the 3-phone. The training sequence 230b (the 2-phone) and the training sequence 230c (the 1-phone) are the back off M-phones in the set. Each training sequence 230a-230c includes a shared segment of the phonetic representation 230, the portion "sh_n," where "_" is a placeholder marking the position where the central phone "ih" is located. Each training sequence 230a-230c is a training data instance that corresponds to a portion of the speech data 112a, as described further below. A representation that uniquely identifies an M-phone is referred to as an M-phone key. The M-phone key can be a string representation of the training sequence 230a-230c or another format that identifies the training sequences 230a-230c.

In some implementations, multiple states or units are used to model each phone. For example, a phone can be modeled by three states in an HMM. The phone "ih" can be modeled by states "ih_1," "ih_2," and "ih_3," which represent characteristics of the beginning, middle, and end of the "ih" phone, respectively. Thus the training sequences can be used to model particular states within a phone, rather than the entire phone. While a set of training sequences 230a-230c corresponding to only the state "ih_1" is illustrated, the mapper 120a can extract similar sets of training sequences can be extracted for other states of the "ih" phone, and for states of other phones in the phonetic representation 220.

In some instances, the amount of phonetic context that surrounds a central phone may not be symmetrical. In such instances, the M-phones that are extracted may include asymmetrical amounts of context. For example, for the phonetic representation 220, there are 4 contextual phones before the phone "ih" and 2 contextual phones after the phone "ih." As a result, the training sequence 230a has a different number of contextual phones before and after the phone "ih," and represents a sequence of six phones rather than a sequence of 7 phones, which would be expected for a 3-phone. To extract training sequences, the mapper 120a can extract asymmetrical back-off M-phones by backing-off from only the longer end of an asymmetrical phonetic representation. When a symmetric amount of context is reached, the mapper 120a can proceed with symmetric back-offs. A symbol, such as "~" can be used in an asymmetrical M-phone to indicate a vacant contextual position for which no contextual phone is available.

The mapper 120a outputs key-value pairs 240a-240c that each identify one of the training sequences 230a-230c, and may include speech data (208). A key-value pair 240a-240c is generated and output for each of the training sequences 230a-230c. The training sequences 230a-230c (or other encoded representation of them them) serve as the keys in the key-value pairs 240a-240c. The values in the key-value pairs 240a-240c can be speech frames or other speech data, although the value may also be empty.

In some implementations, speech frames are only included in the key-value pair 240a for the training sequence 230a that includes the highest number of phones (e.g., the maximal order M-phone). To avoid sending an excessive amounts of data to the reducer, speech frames for the back-off M-phones are not included in the key-value pairs 240b, 240c. As a result, the data in the dataset 122 can include: (i) a key-value pair of <M-phone key, speech frames>, for the longest training sequence; and (ii) a key-value pair of <M-phone key, <empty>> for each of the back-off M-phones.

Although speech frames are not provided for individual back-off M-phones, the corresponding speech frames can be accessed as subsets of the speech frames provided for the maximal order M-phone. If speech frames were transmitted with each key-value pair 240a-240c, the speech frames would be replicated and transmitted M times, substantially increasing the bandwidth requirements for the system. By transmitting the speech frames with only one of the key-value pairs 240a-240c, and caching the speech frames at the reducer, the bandwidth requirements are reduced.

Various techniques can ensure that the reducer can access speech frames for each training sequence 230a-230c. During shuffling, each key-value pair 240a-240c is transmitted to the same reducer 130a-130d for processing. Each key-value pair 240a-240c is routed to the appropriate reducer 130a-130d (by the mapper 120a and/or other processing modules) based on a partitioning key. As discussed above, data associated with a given partitioning key can be processed by exactly one reducer 130a-130d. The partitioning key is a function of the central triphone, which is shared by each training sequence 230a-230c. Because each of the training sequences 230a-230c has the same central triphone, "sh ih n," the key-value pair 240a-240c for each training sequence 230a-230c is assigned the same partitioning key, and is thus received by the same reducer 130a-130c. All key-value pairs that include the same central triphone (e.g., "sh ih n") are handled by the same reducer 130a-130d, regardless of which mapper 120a-120d produced the key-value pair.

In the illustrated example, the partitioning key is a function of the central triphone. As an alternative, in some implementations, another partitioning key system is used. For example, the partitioning key can be determined based on the central phone, or based on a 2-phone, resulting in a different division of work among the reducers 130a-130d.

Because only one key-value pair 240a in the dataset 122 includes speech frames, the reducer that receives the key-value pairs 240a-240c caches the speech frames. As described further below, the reducer processes the key-value pairs 240a-240c in order from longest training sequence to shortest training sequence. Thus the key-value pair for any given M-phone is processed by the reducer before the key-value pairs for any of its back-off M-phones. The reducer can cache the speech frames for all of the back-off M-phones down to the central triphone.

In some implementations, to facilitate the ordering of the training sequences and caching of speech frames, each training sequence can be re-keyed before being output to the reducer. For example, the training sequence 230a, "ih_1/ae k sh_n sil ~" can be keyed as "ih_1/sh n k sil ae ~" to guarantee that data for the same central triphone is processed in order of longest context to shortest context at the reducer processing "partition (ih_1/sh_n)."

In addition to outputting the dataset 122 for "ih_1" (the first state of the phone "ih"), the mapper 120a can also extract training sequences and output key-value pairs that identify training sequences for "ih_2" and "ih_3," which are other states of the phone "ih." The mapper 120 can also generate datasets 122 with other phones in the phonetic representation 220 as the central phone. For example, datasets 122 can be generated with "ae," "k," "sh," and so on as central phones, respectively. In some implementations, the mapper 120a generates a dataset 122 for each state of each phone in the phonetic representation 220. The mapper 120a then proceeds to repeat the described operations for additional input data.

Figure 3:
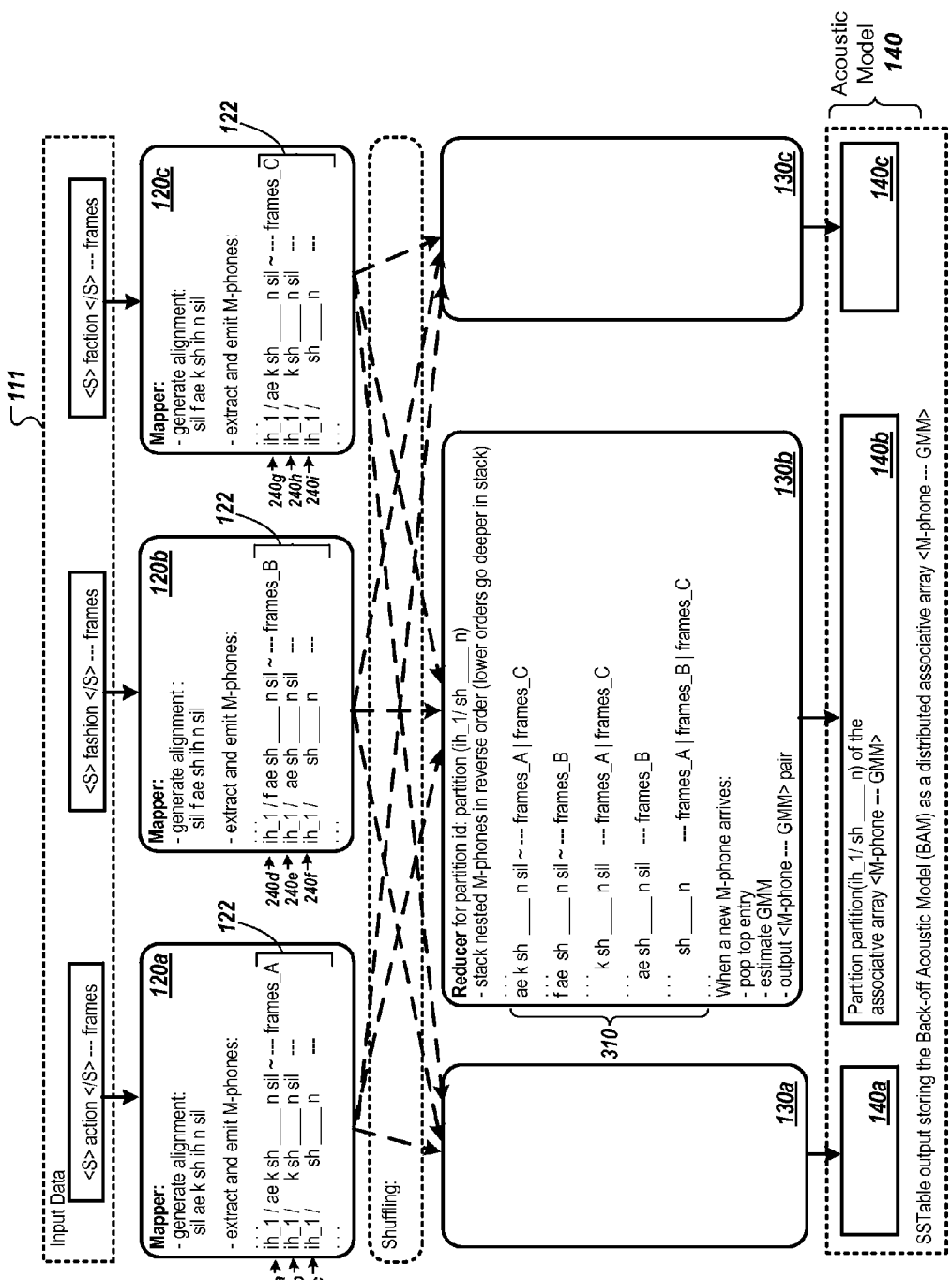
FIG. 3 is a diagram illustrating an example of interactions between mapper processing modules and reducer processing modules of FIG. 1.

FIG. 3 is a diagram illustrating an example of interactions between mapper processing modules 520a-520d and reducer processing modules 530a-530d of FIG. 1. The diagram also illustrates processing performed by the reducer processing modules in further detail. In the illustrated example, three mappers 120a-120c generate key-value pairs 240a-240i based on speech inputs "<S> action <S>," "<S> fashion <S>," and "<S> faction <S>," respectively. For purposes of example, the key-value pairs 240a-240i illustrated each identify a training sequence (e.g., an M-phone) centered on the same central phone, "ih_1." Each of the training sequences also includes the same central triphone sequence, identified by the M-phone key of "ih_1/sh_n."

The output of the mappers 120a-120c is distributed to the reducers 130a-130c during the shuffling phase of processing. Each of reducers 130a-130c is assigned a distinct set of partitioning keys. During shuffling, each reducer 130a-130c receives all of the training sequences with its set of partitioning keys. As described above, the partitioning key for a training sequence is determined using the central triphone within the training sequence. Because the training sequences all include the same central triphone, the training sequences are all transmitted to the same reducer.

In the illustrated example, the partitioning key "ih_1/sh_n" is assigned to the reducer 130b. All of the training sequences include the same central triphone, and therefore are associated with the same partitioning key "ih_1/sh_n." As a result, all of the training sequences are transmitted to the same reducer 130b during shuffling.

During shuffling, the key-value pairs identifying the training sequences can be transmitted to the reducers directly or indirectly through one or more other devices. In some implementations, a mapper may determine that a particular reducer, from a set of reducers, is assigned to process each training sequence. For example, the mapper or another processing device may access a table to determine which reducer is assigned to the partitioning key associated with a given key-value pair. Other methods of routing the key-value pairs to the appropriate reducers can be used.

In some implementations, one or more shuffler processing modules sort the stream of key-value pairs 240a-240i output by the mappers so that the key-value pairs 240a-240i arrive the reducers in a particular order, for example, in order from longest training sequence to shortest training sequence. For example, the key-value stream that arrives at a reducer can sorted so that the key-value pairs arrive at the reducer sorted in lexicographic order of the keys (e.g., the M-phone training sequences). The re-keying of the training sequences, described above, can facilitate this sorting, so that standard string sorting can be used to obtain the appropriate ordering. By sorting the key-value pairs 240a-240c in this manner, it can be guaranteed that the reducer processes the key-value pair for a maximal order M-phone, which includes speech frames, before processing the key-value pairs for the back-off M-phones, which do not include speech frames.

Each key-value pair can be independently directed to the appropriate reducer. For example, the partitioning key associated with a key-value pair can be identified from the key portion of the key-value pair, which identifies a particular training sequence or M-phone. A sequence from the key portion, such as the central triphone, can be used to determine the appropriate partitioning key for that key-value pair.

Reducers aggregate the data in the key-value pairs. In the illustrated example, the reducer 130b aggregates the data in the received key-value pairs 240a-240i, where each represents one instance of a training sequence. The reducer 130b can aggregate the data by adding training sequences to a stack 310. In the stack 310, the training sequences are positioned according to their length. For example, shorter training sequences, such as "sh_n," are placed lower in the stack than longer sequences, such as "ae k sh_n ~."

When the reducer 130b receives a key-value pair for a maximal order M-phone (e.g., key-value pair 240a that includes speech frames), the reducer places it at the top of the stack 310. The key-value pairs for the back-off M-phones (e.g., the key value pairs 240b, 240c that do not include speech frames) arrive afterward, while the key-value pair for the maximal order M-phone is at the top of the stack 310. The back-off M-phones are placed below the maximal order M-phone in the stack 310, and reference the speech frames provided for the maximal order M-phone. As a result, the back-off M-phones are associated with corresponding speech frames in the stack 310, even though speech frames were not provided with the back-off M-phones individually.

Each entry in the stack 310 can represent a unique training sequence or phonetic context. In other words, data for different instances of the same training sequence can be accumulated and stored in a single entry in the stack 310. As the reducer 130a accumulates data from the mappers 120a-120d, multiple key-value pairs are received for the sequences of phones. In other words, data is received that represents instances of the same phonetic context occurring in different speech samples. As an example, the reducer 130b receives three key-value pairs 240c, 240f, 240i that identify the same training sequence, "sh_n." Each key-value pairs 240c, 240f, 240i, or instance of the training sequence "sh_n," corresponds to different speech frames, being subsets of the speech frames "frames_A," "frames_B," and "frames_C," respectively.

After shuffling, and after the data from the key-value pairs 240a-240i is aggregated in the stack 310, the reducer 130b uses the aggregate data to generate portions of the acoustic model 140. The reducer 130b removes the top entry from the stack, and estimates a Gaussian Mixture Model (GMM) (e.g., a linear combination of Gaussians) for the training sequence using the speech frames corresponding to the training sequence. The GMMs produced can be context-dependent, state-specific GMMs. For example, the GMM generated using a given sequence can model the output distribution of a particular HMM state of the central phone of the training sequence. The GMM is dependent on the phonetic context (e.g., the sequence of contextual phones) in the training sequence, as the GMM is generated based on speech frames that each correspond to that phonetic context.

The output of the reducer 130b can be in the form of an array entry, <M-phone, GMM>, which can be stored in a distributed associative array. The reducer 130b then removes the next entry from the top of the stack 310, and estimates a GMM for the training sequence that this entry represents. The reducer 130b continues to generate acoustic model data based on each of the entries in the stack 310, with each entry representing a different phonetic context. The pairs of training sequences and GMMs are written to the distributed associative array. In some implementations, the distributed associative array is an immutable persistent B-tree, such as an SSTable.

As described above, each phone can be represented by multiple HMM states (e.g., "ih" can be represented by HMM states "ih_1," "ih_2," and "ih_3,"). In some implementations, each GMM stored in the acoustic model 140 can model the output distribution of a particular HMM state of a particular phone. The GMMs are conditioned on the identity of the HMM state (e.g., "ih_1") and also on the surrounding phonetic context (e.g., the contextual phones in an M-phone). Accordingly, each GMM is identified by surrounding phonetic context, identity of the central phone, and the particular HMM state of the central phone. Each GMM can store, for example, the number of Gaussian components in the GMM, and weights for each of the components. Diagonal covariance Gaussians, full covariance Gaussians, or other representations can be used. In addition, each GMM can have a dimensionality equal to the dimensionality of the feature vectors used to train the model and/or recognize speech using the model. For example, if a 39-dimensional feature vector is used to describe speech characteristics, then a 39-dimensional GMM can be used to store data for each of the 39 feature dimensions.

In some implementations, reducers only generate an entry in the acoustic model 140 when at least a minimum number of instances of the training sequence have been received. For example, the reducer 130b determines the number of sets of speech frames that have been accumulated for a training sequence. If the number of frames is greater than or equal to the minimum threshold, the reducer 130b produces a GMM for the training sequence and outputs the <M-phone, GMM> entry to the associative array. If the number of frames is less than the minimum threshold, the training sequence is omitted from the model. In this manner, training of the acoustic model 140 is avoided for training sequences that occur infrequently in the input data. In some implementations, the number of Gaussian components in a given GMM is determined based on the number of speech frames aligned against a particular HMM state of a phone during training. For example, a GMM can be sized as a function of the number of frames, n, using a log-linear rule:

$$\log(\text{no. mix components}) = \log(\beta) + \alpha \cdot \log(n),$$

where $\beta$ and $\alpha$ are empirically derived constants, selected to set an appropriate number of Gaussian mixture components in a GMM. $\beta$ can represent a default number of mixture components and $\alpha$ can control the degree to which additional mixture components are included. Typically, $\alpha$ has a value of less than one. Using the training techniques described herein, large numbers of Gaussian mixture components can be used to model a given HMM state and phonetic context. In some implementations, 50, 100, 500, or 1000 or more Gaussian mixture components can be included in a context-dependent GMM that models an HMM state.

In some implementations, the reducers use a subset of the sets of speech frames for a given training sequence when the number of sets of speech frames exceeds a threshold. For example, when the number of instances of training data for a training sequence exceeds the threshold, the reducer can use reservoir sampling techniques to produce a GMM based on a proper subset of the training data instances.

To use the trained acoustic model 140, a system can look up the GMM for a particular phonetic context of interest. For a test sequence of phones, an appropriate partitioning key is determined based on the central triphone in the sample sequence. The partitioning key identifies the particular partition of the distributed array that stores the data for the test sequence (and for all other phonetic contexts that include the same central triphone). Within the identified partition of the distributed array, the sample sequence itself can act as a key used to look up the corresponding GMM for the test sequence, if one exists in the array.

Figure 4:
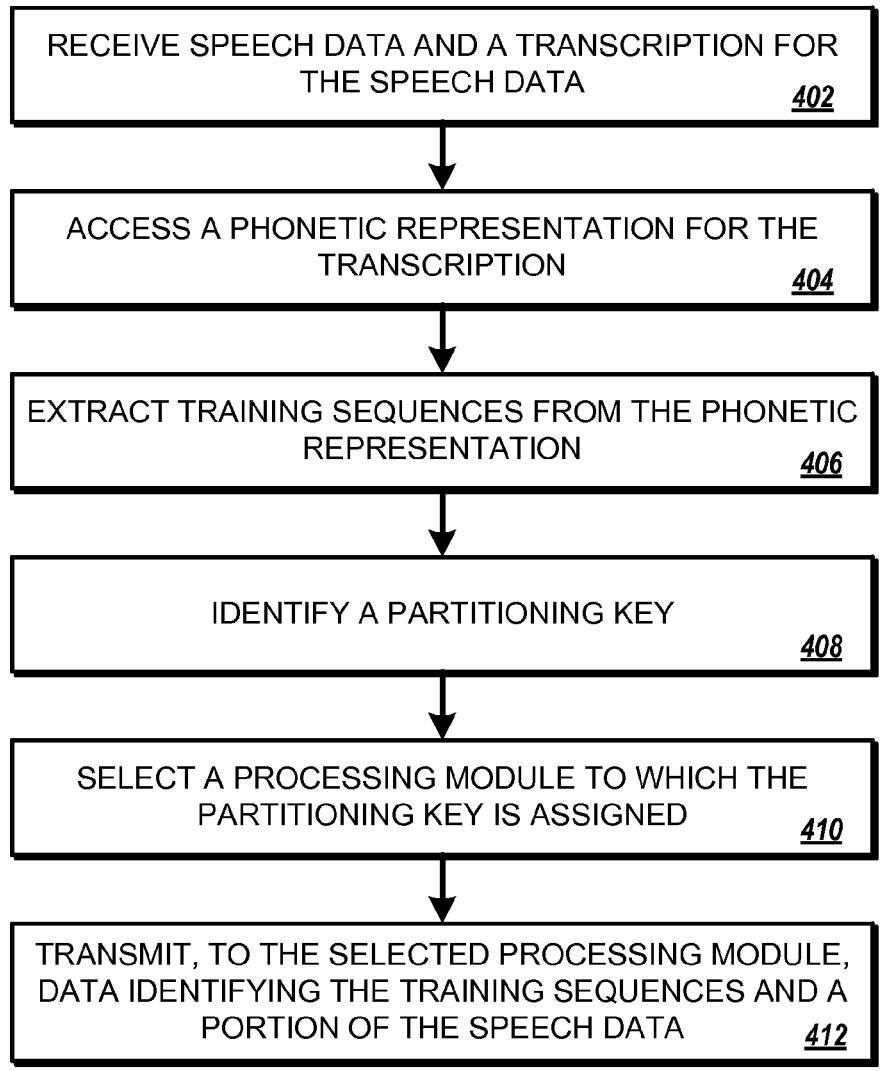
FIG. 4 is a flow diagram that illustrates an example of a process for training an acoustic model.

FIG. 4 is a flow diagram that illustrates an example of a process 400 for training an acoustic model. Briefly, speech data and a transcription for the speech data are received. A phonetic representation for the transcription is accessed. Training sequences are extracted from the phonetic representation. A partitioning key is identified. A processing module to which the partitioning key is assigned is selected. Data identifying the training sequences and a portion of the speech data is transmitted to the selected processing module.

In further detail, speech data and a transcription for the speech data are received (402). The speech data can include feature vectors that indicate speech characteristics. A feature vector can be received for each of multiple speech frames, where each speech frame represents, for example, 10 milliseconds of speech. The speech data and the transcription can be received at a mapper processing module.

A phonetic representation for the transcription is accessed (404). The phonetic representation can be a sequence of context-independent phones.

Training sequences are extracted from the phonetic representation (406). The training sequences are extracted for a particular phone in the phonetic representation. For example, the particular phone can be a central phone in each of the training sequences. Each of the training sequences can include a different set of contextual phones surrounding the particular phone. For example, each of the training sequences can be an M-phone, with a different integer value of M, as described above. The extracted sequences can include at least, for example, a first sequence that includes one contextual phone before the particular phone and one contextual phone after the particular phone, a second sequence that includes two contextual phones before the particular phone and two contextual phones after the particular phone, and a third sequence that includes three contextual phones before the particular phone and three contextual phones after the particular phone. Each of the training sequences can be sequences of consecutive phones in the phonetic representation.

A partitioning key is identified based on a sequence of phones that occurs in each of the training sequences (408). The partitioning key can be identified based on a sequence of two or more consecutive phones that occurs in each of the training sequences. The partitioning key can be based on a sequence that includes at least one contextual phone before the particular phone and at least one contextual phone after the particular phone. The sequence of phones used to identify the partitioning key can be the central triphone, which can be shared by all of the training sequences. In some implementations, a partitioning key is identified for each of the training sequences, and the same partitioning key is identified for each of the training sequences.

A processing module, to which the identified partitioning key is assigned, is selected from among a plurality of processing modules (410). The selected processing module is designated to train a portion of an acoustic model that corresponds to the identified partitioning key.

Data identifying the training sequences and a portion of the speech data are transmitted to the selected processing module (412). The data can be transmitted to the selected processing module and not transmitted to any other processing module assigned to generate a portion of the acoustic model. The portion of the speech data that is transmitted can be a portion that corresponds to the training sequence that includes the most contextual phones.

To transmit the portion of the speech data, an instance of speech data can be transmitted for fewer than all of the training sequences. The portion of speech data that is transmitted can be speech data corresponding to the training sequence that includes the most contextual phones. In some implementations, additional instances of speech data are not transmitted for the other training sequences. In other words, speech data can be transmitted with only the longest training sequence of the training sequences.

The process 400 can include receiving, at the selected processing module, the data identifying the training sequences and the portion of the speech data that corresponds to the training sequence that includes the most contextual phones. At the selected processing module, a different subset of the received speech data can be accessed for each of the training sequences.

In some implementations, the training sequences are first training sequences that each include the same central triphone. The partitioning key is identified based on the central triphone included in the first training sequences. Second training sequences that include the central triphone can also be extracted from a second phonetic representation for second speech data. Data identifying the second training sequences can be transmitted to the same processing module to which the data identifying the first training sequences is transmitted. For example, a partitioning key can be identified for one or more of the second training sequences based on the central triphone, and the partitioning key can be the same partitioning key identified for the first training sequences.

In some implementations, the process 400 includes receiving, at the selected processing module, the data identifying the training sequences and the portion of the speech data. At the selected processing module, speech data for the training sequences can be aggregated with speech data for other instances of the training sequences. A model for a first training sequence of the training sequences can be generated based on the aggregated speech data for the first training sequence. The model can be a context-dependent, state-specific GMM. For example, the model can be a context-dependent GMM dependent on the sequence of contextual phones included in the first training sequence, where the GMM models the output distribution of a HMM state of a central phone of the first training sequence.

The generated model can be stored in a distributed associative array. For example, the generated model can be stored in a partition of the distributed associative array that is associated with the identified partitioning key. The generated model can be stored in the distributed associative array in association with a key that uniquely corresponds to the first training sequence. For example, the key can be associated with the model for the first training sequence, and in the distributed associative array the key is not associated with any model for any other training sequence.

In some implementations, the selected processing module determines that the aggregated speech data includes data for fewer than a threshold number of instances of a second training sequence of the training sequences. In response to the determination, the selected processing module does not generate a model for the second training sequence.

Figure 5:
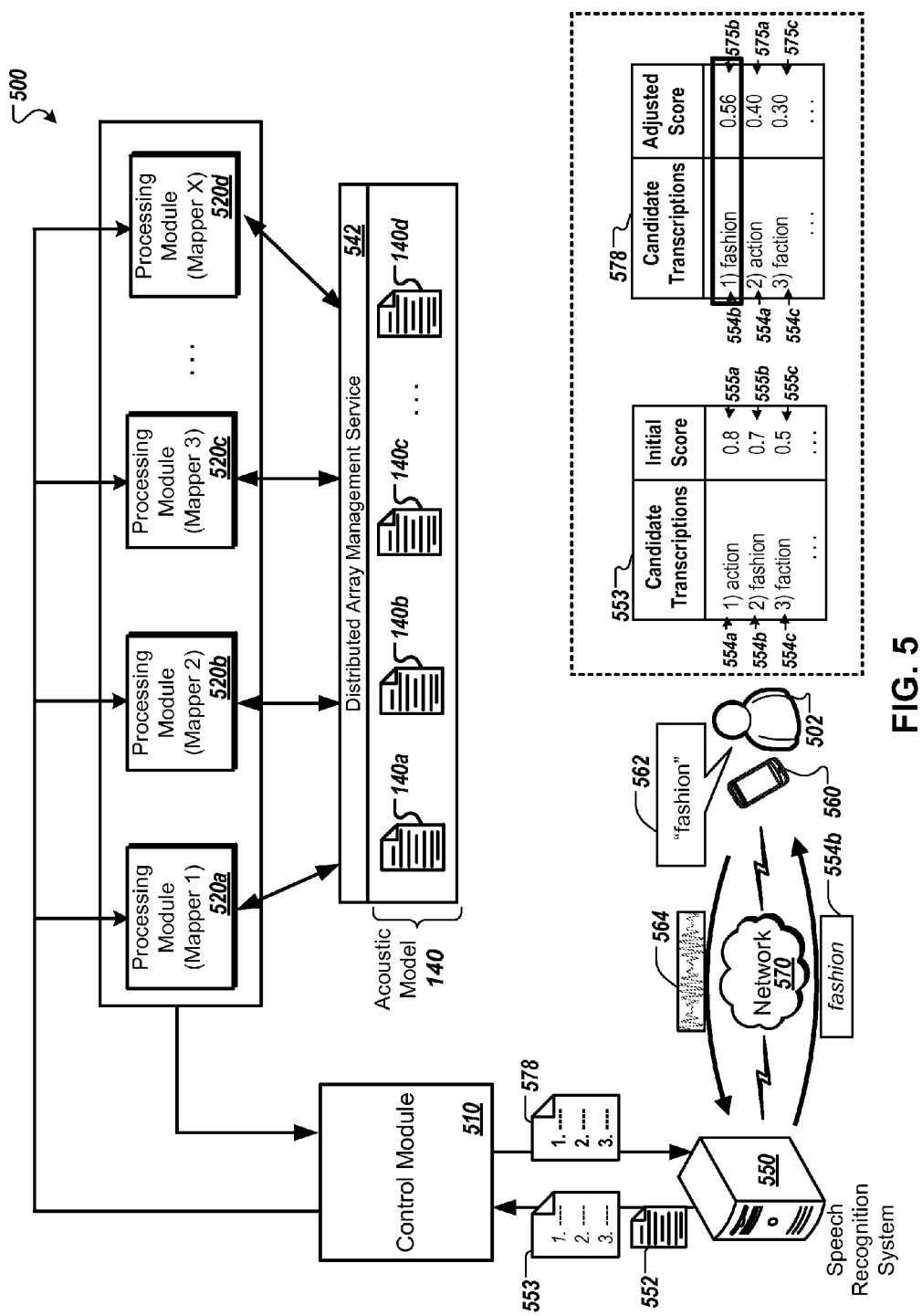
FIG. 5 is a diagram illustrating an example of a system that can perform speech recognition using a variable length of phonetic context.

FIG. 5 is a diagram illustrating an example of a system 500 that can perform speech recognition using variable lengths of phonetic context. The system 500 can use an acoustic model that recognizes varying lengths of phonetic context, such as the acoustic model 140, to recognize speech. The system 500 includes a number of processing modules, referred to as mappers 520a-520d. The system 500 also includes a control module 510, and a speech recognition system 550 that communicates with a computing device 560 over a network 570.

The computing device 560 can be, for example, a desktop computer, a laptop computer, a cellular phone, a smartphone, a personal digital assistant (PDA), a tablet computer, a wearable computer, a navigation system, or another computing device. The operations performed by the speech recognition system 550 can be performed by individual computer systems or can be distributed across multiple computer systems. The speech recognition system accesses the acoustic model 540, stored on one or more data storage devices, which can be connected directly or over the network 570. The network 570 can be wired or wireless or a combination of both. The network 570 can include one or more public or private networks, and can include the Internet.

The system 500 can assess candidate transcriptions for an utterance using different amounts of phonetic context. Test sequences having varying numbers of phonetic units are compared with contexts recognized by the acoustic model 140. The largest amount of phonetic context recognized by the acoustic model 140 is used to rank the candidate transcription. During evaluation of a candidate transcription, "backing off" to use a smaller context is penalized. This reflects that a match to a relatively small phonetic context in the acoustic model 140 suggests a lower likelihood of accuracy than matches to a large phonetic context in the acoustic model 140.

For example, speech data and data identifying a candidate transcription for the speech data are received. A phonetic representation for the candidate transcription can be accessed. Multiple test sequences can be extracted for a particular phone in the phonetic representation. Each of the multiple test sequences can include a different set of contextual phones surrounding the particular phone. Data indicating that an acoustic model includes data corresponding to one or more of the multiple test sequences can be received. From among the one or more test sequences, the test sequence that includes the highest number of contextual phones can be selected. A score for the candidate transcription can be generated based on the data from the acoustic model that corresponds to the selected test sequence.

In the example illustrated in FIG. 5, the computing device 560 records audio that contains an utterance 562, "fashion," spoken by a user 502 of the computing device 560. The computing device 560 sends speech frames 564 including the utterance 562, such as a waveform or other form of encoded audio, to the speech recognition system 550.

The speech recognition system 550 can include a front end module that extracts speech parameters from the speech frames 564. For example, the speech recognition system 550 can extract a series of speech frames 552, where each frame is a feature vector that represents speech characteristics that occur during approximately 10 milliseconds of input speech. Any appropriate feature extraction algorithm can be used, including, for example, algorithms that extract mel-frequency cepstral components (MFCCs).

The speech recognition system 550 performs a "first pass" of speech recognition to identify candidate transcriptions for the utterance 562. The speech recognition system 550 can use an acoustic model other than the acoustic model 140. For example, the acoustic model used for the first pass may be locally stored, rather than distributed, and may use a fixed amount of phonetic context (e.g., 3 phones) rather than a variable amount of phonetic context. In some implementations, the acoustic model used for the first pass recognition is trained using training data or training techniques different from those used to train the acoustic model 140.

The first pass recognition phase produces candidate transcriptions 554a-554c, each of which is assigned a corresponding score 555a-555c. Each score 555a-555c can indicate, for example, a likelihood that the candidate transcription to which the score is assigned is a correct transcription for the utterance 562. For example, the scores 555a-555c can be confidence scores, output by the acoustic model used for the first pass recognition, that indicate the model's confidence that the candidate transcription is correct. The candidate transcriptions 554a-554c are ranked according to the scores 555a-555c.

The speech recognition system 550 selects a subset of the candidate transcriptions 554a-554c for a "second pass" of speech recognition using the acoustic model 140. For example, a highest-ranking subset of the candidate transcriptions 554a-554c (e.g., the set of candidate transcriptions 554a-554c believed most likely to be correct) can be selected. In some implementations, the speech recognition system 550 selects the N highest-ranking candidate transcriptions 554a-554c, where N is an integer, such as 5, 10, or 20. Other values of N can also be used.

The speech recognition system 550 outputs the speech frames 552 and recognition data 553, which identifies the candidate transcriptions 554a-554c and the corresponding scores 555a-555c, to a distributed computing framework that performs the second pass of speech recognition. For example, the speech recognition system 550 can transmit the recognition data 553 to a control module 510, such as a master processing module of a MapReduce implementation. The control module 510 assigns recognition tasks to the mappers 520a-520d, and coordinates outputs of the second pass of recognition.

In some implementations, the control module 510 assigns the mappers 520a-520d to recognize different utterances in a speech sequence. For example, from a sequence of multiple words spoken by the user 502, the control module 510 provides speech frames and candidate transcriptions for a first word to the mapper 520a, provides speech frames and candidate transcriptions for a second word to the mapper 520b, and so on. Thus a series of utterances by a user 502 may be processed by different mappers 502a-502d. Similarly, when recognizing speech from multiple users, the various mappers 502a-502d can recognize utterances for different users.

In the illustrated example, the control module 510 assigns a single mapper, e.g., the mapper 520a, to evaluate all of the candidate transcriptions 554a-554c. Because all of the candidate transcriptions 554a-554c corresponding to the utterance 562 are evaluated at the same mapper 520a, there is no need to replicate the speech frames 552 among multiple mappers 520a-520d, which conserves bandwidth and facilitates efficient processing of large amounts of data.

The mapper 520a determines a phonetic representation for each of the candidate transcriptions 554a-554c, and extracts test sequences of phonetic units, as described in further detail below with respect to FIG. 6. For example, for a given candidate transcription, the test sequences can include a maximal order M-phone and corresponding back-off M-phones for each HMM state of each phone in the phonetic representation for the candidate transcription. The mapper 520a extracts the test sequences for each of the candidate transcriptions 554a-554c in the highest-ranking set of candidate transcriptions.

Using the extracted test sequences, the mapper 520a obtains acoustic model data from the acoustic model 140. The acoustic model 140 can be accessed through a distributed array management service 542. The service 542 can be an in-memory key-value serving system (e.g., an SSTable service) with S server modules (not shown) each storing 1/S-th of the data in the acoustic model 140. For example, each of the S server modules can store one or more of the partitions 140a-140d in RAM.

In response to a request, the service 542 can look up acoustic model data (e.g., a GMM stored in the acoustic model 140) that corresponds to a given test sequence, if data for that phonetic sequence exists in the acoustic model 140. The mapper 520a sends a batch request that identifies the extracted test sequences. In response, the service 542 retrieves acoustic model data for the test sequences from the various partitions 140a-140d of the acoustic model 140.

To identify the appropriate partition in which to obtain data for a given test sequence, the service 542 uses the same partitioning keys that were used to train the acoustic model 140. For example, the partitioning key that identifies a test sequence is a function of the HMM state identity and the central triphone of the sequence. As an example, for a test sequence "ih_1/ae k sh_n sil ~," the partitioning key can be "ih_1/sh_n," or another representation of this sequence. The service 542 identifies the appropriate partition 140a-140d that corresponds to the partitioning key. Within the identified partition, the acoustic model data for the test sequence can be obtained using a key that uniquely specifies the portion of the acoustic model 140 that corresponds to that test sequence (e.g., a key based on the full test sequence "ih_1/ae k sh_n sil ~"). For each of the test sequences, the service 542 provides the corresponding acoustic model data to the mapper 520a that requested the data.

The mapper 520a uses the acoustic model data adjust the scores 555a-555c for the candidate transcriptions 554a-554c. For example, for each candidate transcription, the mapper 520a can generate a score that indicates a likelihood, based on the received data from the acoustic model 140, that the candidate transcription is a correct transcription for the speech frames 552, and thus for the utterance 562. Scores based on data from the acoustic model 140 can be combined with the scores 555a-555c from the first pass of recognition to produce adjusted scores 575a-575c. The candidate transcriptions 554a-554c are re-ranked according to the adjusted scores 575a-575c.

As described further below, the evaluation of the candidate transcriptions is performed using the model data for the largest phonetic context that the acoustic model 140 recognizes. When acoustic model data is obtained for a test sequence that is a maximal order M-phone, which represents the maximum amount of phonetic context, that acoustic model data is used to generate the adjusted score. However, when acoustic model data is not available for a maximal order M-phone, the mapper 520a uses acoustic model data for the back-off M-phone having the highest number of contextual phones to generate the adjusted score. Thus, for a given candidate transcription, the acoustic model data used to assess different HMM states may have output distributions corresponding to different lengths of phonetic context. Some GMMs used may have been trained based on 5 phones before and/or after a subject phone, other GMMs used may have been trained using 4 phones before and/or after a central phone, and so on. Nevertheless, by using the acoustic model data for the largest amount of phonetic context, the system can improve the accuracy of recognition.

After re-ranking the candidate transcriptions 554a-554c, the mapper 520a sends recognizer data 578 that identifies the updated ranking to the control module 510, which sends the recognizer data 578 to the speech recognition system 550. The speech recognition system 550 uses the updated ranking to select one or more candidate transcriptions 554a-554c to provide to the computing device 560. In the illustrated example, the candidate transcription 554b, "fashion," is provided as a transcription for the utterance 562. While the first pass of speech recognition considered the candidate transcription 554a, "action," to be the most likely transcription, the second pass using the acoustic model 140 adjusted the ranking to indicate that the candidate transcription 554b, "fashion," was most likely to be correct.

In general, evaluating a transcription using a higher number of contextual phones can produce more accurate results than using a lower number of contextual phones. Accordingly, using an acoustic model 140 that can recognize a variety of lengths of phonetic context can provide better recognition accuracy than systems that only recognize a fixed length of phonetic context. The improvement in accuracy can be quantified in lower word-error rates (WER) for acoustic models that use back-off M-phones, as compared to techniques that use acoustic models that use only fixed-length phonetic context.

Figure 6:
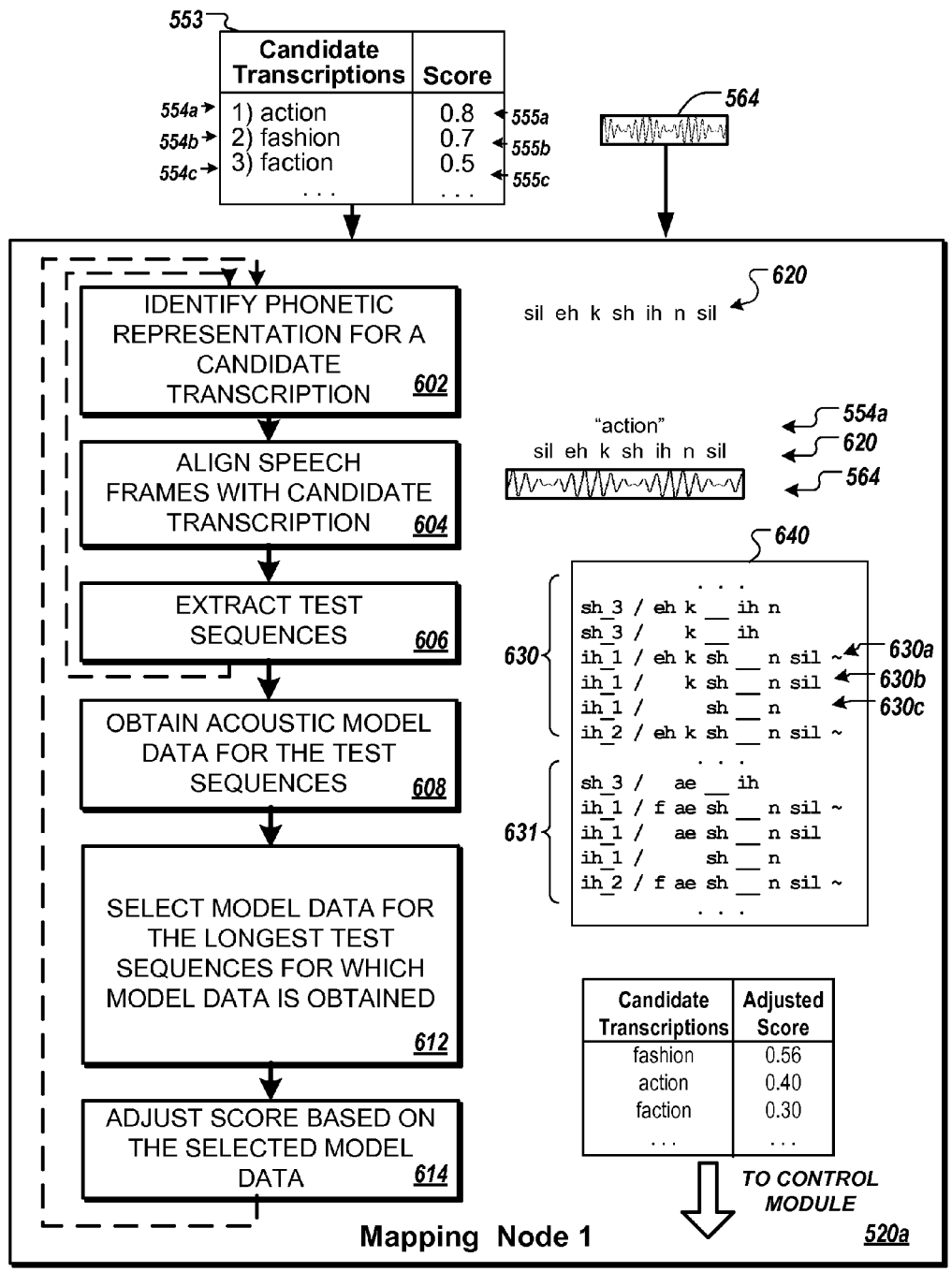
FIG. 6 is a diagram that illustrates processing performed by a mapper to evaluate candidate transcriptions for an utterance.

FIG. 6 is a diagram that illustrates processing performed by a mapper to evaluate candidate transcriptions for an utterance. In the illustrated example, the mapper 520a of FIG. 5 receives the recognizer data 553 and speech frames 552 described above. The mapper 520a evaluates the N highest-ranking candidate transcriptions 554a-554c for the utterance 562.

The mapper 520a identifies a phonetic representation 620 for a candidate transcription 554a (602). The mapper 520a can obtain the phonetic representation 620 from, for example, a pronunciation lexicon, as described above.

The mapper 520a aligns the speech frames 564 with the candidate transcription 554a (604). The mapper 520a can generate a context-dependent state level Viterbi alignment after composing H ○C ○L, where L, C, and H respectively denote the pronunciation lexicon, a context dependency tree, and HMM-to-state FSTs, as described above.

The mapper 520a extracts test sequences 630 from the phonetic representation 620 (606). The test sequences 630 can be M-phones, as described above. For example, for each HMM state of each phone in the phonetic representation 620, a maximal order M-phone can be extracted, and back-off M-phones can also be extracted down to a central triphone. The maximum value of M can be the same as the maximum value of M used to train the acoustic model 140. In the illustrated example, the maximum value of M is 3, but other values, such as 2, 4, 5, 7, etc., can be used.

As described above, when the phonetic context around a phone is not symmetrical, the mapper 520a extracts test sequences that include asymmetric numbers of contextual phones before and after the phone. The symbol "~" denotes a vacant contextual position in an asymmetrical M-phone. Extracting asymmetrical M-phones as test sequences 630 permits a larger amount of context to be matched in the acoustic model 140 than, for example, simply using a lower order M-phone and omitting one or more contextual phones from the end with the longest context. Using asymmetrical M-phones can be particularly helpful for recognizing phones that occur at or near a word or sentence boundary, where phonetic context on one side of the phone may be limited. The mapper 520a can extract asymmetrical test sequences by backing off from only the side of the central phone that includes the largest number of contextual phones, until a symmetrical numbers of contextual phones are present around the central phone. The mapper 520a can then back-off from both sides, thereafter generating test sequences with symmetrical numbers of contextual phones around the central phone.

In some implementations, the mapper 520a obtains a phonetic representation (602), aligns the phonetic representation to the speech frames 564 (604), and extracts test sequences (606) for each of the candidate transcriptions 554a-554c. For example, the mapper 520a extracts the test sequences 631 from a phonetic representation for the candidate transcription 554b, "fashion." Test sequences are also extracted for the candidate transcription 554c and any other candidate transcriptions received by the mapper 520a. In some implementations, the mapper 520a adds the test sequences 630, 631 for all of the candidate transcriptions 554a-554c to a pool or set 640. The set 640 is initialized once for each utterance (e.g., each word).

The mapper 520a obtains acoustic model data for the test sequences 630, 631 in the set 640 (608). For example, the mapper 520a sends data identifying the test sequences 630, 631 in the set 640 to the distributed array management service 542 as a batch request. In particular, the mapper 520a can initiate a remote procedure call to a master processing module of the service 542, identifying the test sequences 630, 631 in the set 640. The master processing module then attempts to look up the GMM corresponding to each test sequence in the set 640.

The master processing module applies the partitioning function to each test sequence, thus obtaining the respective partitioning keys for the test sequences. The partitioning keys identify which partitions 140a-140d will contain the data for the GMMs corresponding to the test sequences, if the GMMs exist in the acoustic model 140. Data in the partitions 140a-140d can be served by different server modules, each assigned different partitioning keys. The master processing module identifies the server modules assigned to the identified partitioning keys, and requests from each server module the GMM data for the test sequences associated with its assigned partitioning key(s). When the partition(s) 140a-140d handled by a server module include a GMM entry for a test sequence (e.g., an entry for a key that uniquely corresponds to the test sequence), the server module provides the GMM data to the master processing module, which provides the GMM data to the mapper 520a. When the partition(s) 140a-140d of a server module do not include an entry for a test sequence, no data is returned for that test sequence.

From the received acoustic model data, the mapper 520a selects the acoustic model data that corresponds to the longest test sequences (e.g., those including the highest number of contextual phones) (612). As an example, the test sequences 630 for the candidate transcription 554a include a 3-phone 630a, a 2-phone 630b, and a 1-phone 630c for the "ih_1" HMM state. If acoustic model data is received for each of the test sequences 630a-630c, then the data received for the 3-phone 630a is used to score the "ih_1" HMM state, and the data for the 2-phone 630b and the 1-phone 630c is not used. However, if no acoustic model data is received for the 3-phone 630a, then the data received for the test sequence having the next-highest number of contextual phones—the 2-phone 630b—is used. By selecting the acoustic model data for test sequences having the highest number of contextual phones, the mapper 520a ensures that the maximum amount of phonetic context recognized by the acoustic model 140 is used.

The mapper 520a then adjusts the scores 555a-555c for the candidate transcriptions 554a-554c using the selected acoustic model data. The selection of the acoustic model data and adjustment of the scores 555a-555c is described in further detail with respect to FIG. 7.

Figure 7:
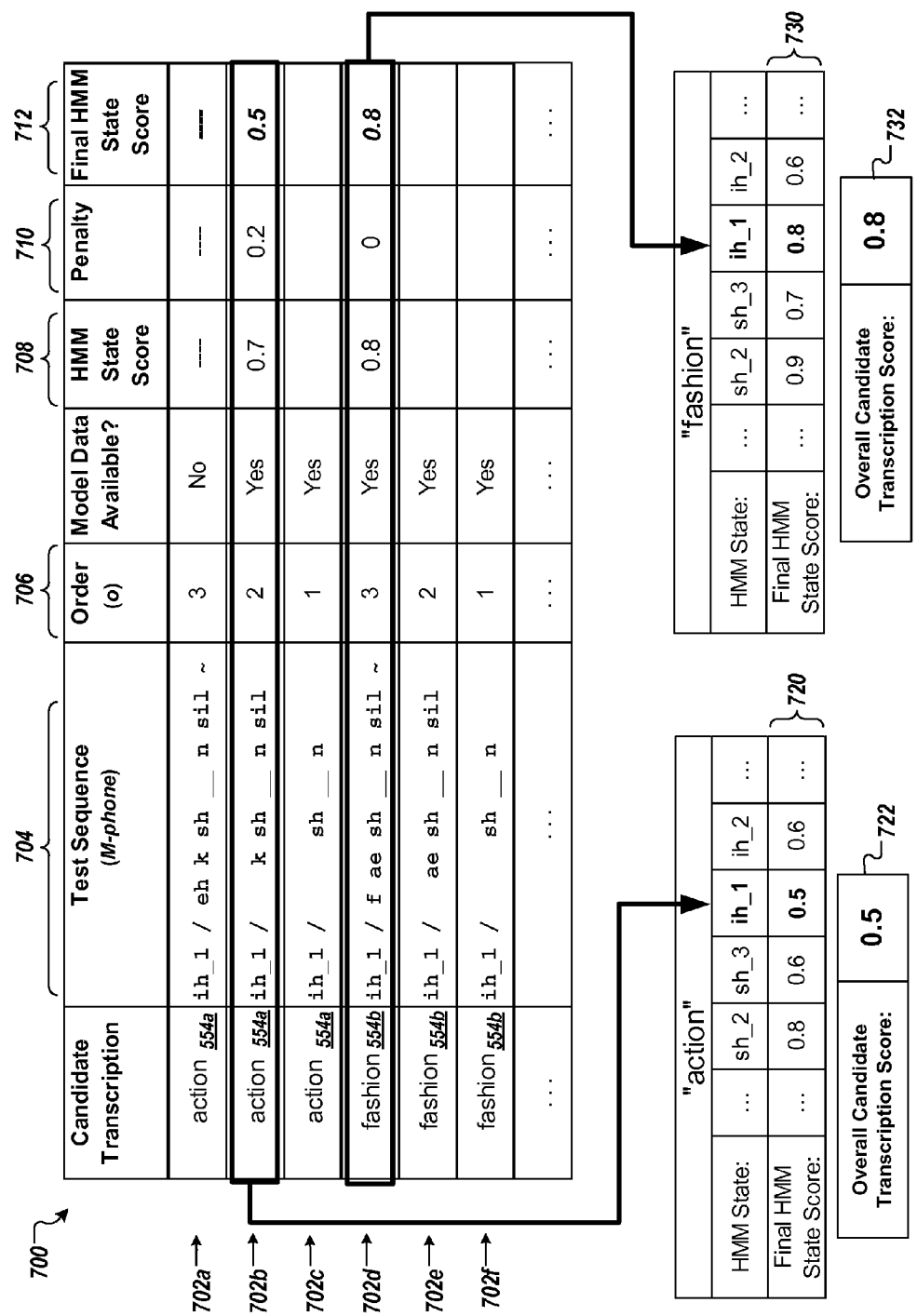
FIG. 7 is a diagram that illustrates scoring of candidate transcriptions.

FIG. 7 is a diagram that illustrates scoring of candidate transcriptions. FIG. 7 includes a table 700, and each row 702a-702f corresponds to a different test sequence 704. The table 700 also indicates the order 706 of each test sequence 704, or in other words, the number of contextual positions before and after a central phone that are included in the test sequence 704.

When the mapper 520a requests acoustic model data for the test sequences 704, the distributed array management service 542 may provide acoustic model data for fewer than all of the test sequences 704. In other words, there may be some test sequences 704 that represent phonetic contexts that are not recognized by the acoustic model 140, and so no corresponding data is available. When acoustic model data for the highest-order training sequence is not available (e.g., for order M=3 in the illustrated example), the mapper 520a backs-off to use data for a training sequence representing a smaller amount of phonetic context.

As an example, the rows 702a-702c each include training sequences 704 corresponding to the "ih_1" HMM state in the phonetic representation of the candidate transcription 554a "action." The table 700 indicates, however, that no acoustic model data is available for the 3-phone in the row 702a, which includes the highest number of contextual phones. As a result, acoustic model data for one of the back-off test sequences is used. In particular, acoustic model data is available for the 2-phone in the row 702b, so the acoustic model data for that test sequence is used to generate a score for the "ih_1" HMM state.

As another example, the rows 702d-702f each include training sequences 704 corresponding to the "ih_1" HMM state in the phonetic representation of the candidate transcription 554b "fashion." Because acoustic model data is available for the maximal order test sequence, the 3-phone in row 702d, the acoustic model data for that row is selected.

With the selected acoustic model data, the mapper assigns an HMM state score 708 for each HMM state in the phonetic representation of each candidate transcription. The HMM state scores 708 can indicate a likelihood that the HMM state accurately represents the corresponding speech frames, given the phonetic context in the test sequence 704. The retrieved acoustic model data for a test sequence 704 can include data that describes a GMM trained for the particular HMM state and phonetic context indicated by the training sequence 704

To penalize the use of lower-order training sequences, a per-frame back-off cost can be incurred for training sequences having an order 706 less than the maximum value of M. The penalty 710 for a back-off training sequence can be assigned with the following equation:

$$\text{Penalty} = C \times (M_{max} - o),$$

where C is a unit cost per backed-off phone, the amount of the $M_{max}$ is the maximum value of M, and o is the order of a test sequence. Accordingly, the more phones that are dropped or backed-off (and thus the fewer contextual positions represented by the test sequence), the higher the penalty 710. In some implementations, test sequences that include asymmetric numbers of contextual phones are not penalized. The order, o, of an asymmetric test sequence is computed as the maximum of the number of contextual phones before the central phone and the number of contextual phones after the central phone.

In the illustrated example, the value of C is set at 0.2, and the value of $M_{max}$ is 3. For the 2-phone in the row 702b, one contextual phone or contextual position is omitted relative to the maximal order 3-phone. As a result, the penalty 710 for the row 702b is 0.2×(3−2), for a penalty of 0.2. By contrast, the 3-phone in row 702d is a maximal order training sequence, and since no contextual phones were omitted, no penalty is incurred.

The mapper 520a applies the penalties 710 to the HMM state scores 708 to generate final HMM state scores 712. The penalties 710 can be applied by, for example, subtracting the penalty from the HMM state scores 708, or otherwise adjusting the HMM state scores 708 to indicate a reduced confidence that the HMM state is correct. The final HMM state scores 712 are then used to generate scores for the candidate transcriptions. The techniques described can be used to generate a final HMM state score for each of the HMM states of each phone in the phonetic representation for a candidate transcription.

In some instances, acoustic model data is not available for any of the test sequences for a given HMM state and phonetic context. In that case, the mapper 520a can rely on an earlier score for the HMM state produced during the first pass of speech recognition. Because none of the test sequences were recognized by the acoustic model 140, a penalty can be applied to the first-pass score. When the mapper 520a backs-off all the way to using the first pass acoustic model, the order, o, can be considered to be zero, and the per-phone back-off cost may reach its maximum value.

The combined set of HMM state scores is then used to generate an overall score for each candidate transcription. In the illustrated example, the scores 720 are assigned for the different HMM states of the phonetic representation for the candidate transcription 554a, "action." Combining the scores 720 produces an overall score 722 of "0.5" for the candidate transcription 554a. The scores 730 are assigned for the different HMM states of the phonetic representation for the candidate transcription 554b, "fashion." Combining the scores 730 produces an overall score 732 of "0.8" for the candidate transcription 554b. In the illustrated example, the higher overall score for the candidate transcription 554b indicates that, using the acoustic model 140 with variable phonetic contexts, the transcription "fashion" is considered more likely to be a correct transcription for the speech frames 564 than "action."

The overall scores 722, 732 for the acoustic model 140 can be combined with the scores 555a-555c from the first pass of speech recognition to determine the adjusted scores 575a-575c used to rank the candidate transcriptions 554a-554c in FIG. 5. The adjusted score 575a-575c for each candidate transcription 554a-554c is computed by log-linear interpolation between the scores 555a-555c produced by the first pass acoustic model, and the overall scores 722, 732 produced using the second pass acoustic model 140. The final score can be calculated using the following equation:

$$\log P_{AM}(A|W) = \lambda \cdot \log P_{first\,pass}(A|W) + (1.0-\lambda) \cdot \log P_{second\,pass}(A|W),$$

where A denotes the acoustic features, W denotes the word sequence, and $\lambda$ is a weighting value that sets the influence of the first pass and second pass acoustic models. In the illustrated example, the scores for the first pass acoustic model and the second pass acoustic model are equally weighted. Addition in logarithmic probability space results in multiplication in regular probability space. As an example, the score 575b for the candidate transcription 554b can have a value of 0.56, resulting from the value of the score 555b (e.g., 0.7) multiplied by the score 732 (e.g., 0.8).

In some implementations, the scores used to rank the candidate transcriptions are also based on the output of one or more language models. The combined score for the a candidate transcription based on acoustic model probability scores and language model probability scores can be computed with the following equation:

$$\log P(W|A) = 1/lmw \cdot \log P_{AM}(A|W) + \log P_{LM}(W),$$

where A denotes the acoustic features, W denotes the word sequence, and lmw is the language model weight. The scores reflecting both the acoustic model output and the language model output can be used to select one or more transcriptions that are determined to be most likely to be correct.

Figure 8:
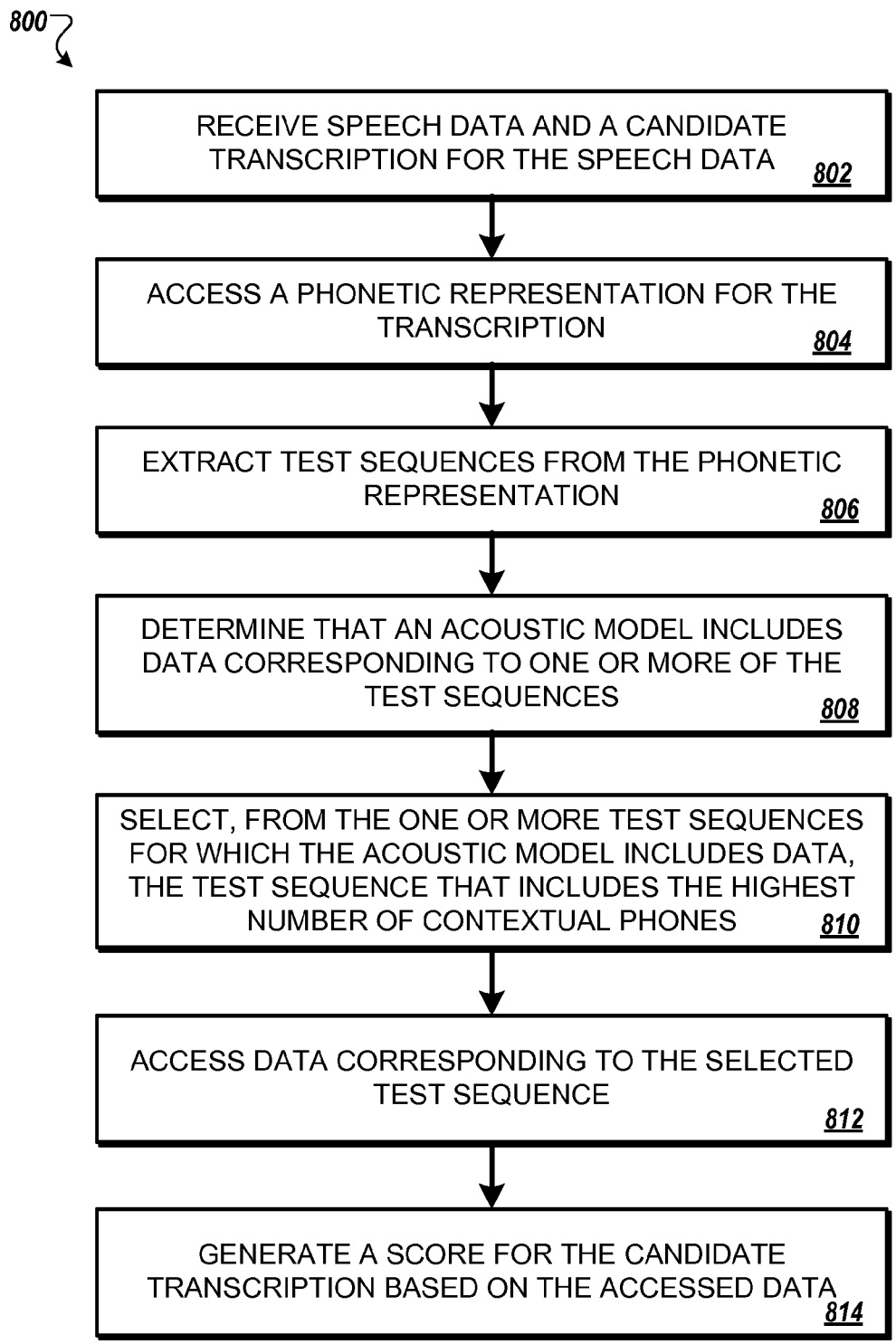
FIG. 8 is a flow diagram illustrating a process for recognizing speech using a variable length of phonetic context.

FIG. 8 is a flow diagram illustrating a process 800 for recognizing speech using a variable length of phonetic context. Briefly, the process 800 includes receiving speech data and data identifying a candidate transcription for the speech data, accessing a phonetic representation for the candidate transcription, extracting multiple test sequences from the phonetic representation, receiving data indicating that an acoustic model includes data corresponding to one or more of the multiple test sequences, selecting, from among the one or more test sequences for which the acoustic model includes data, the test sequence that includes the highest number of contextual phones; accessing data from the acoustic model corresponding to the selected test sequence, and generating a score for the candidate transcription based on the data from the acoustic model that corresponds to the selected test sequence.

In further detail, speech data and data identifying a candidate transcription for the speech data are received (802). The speech data can include feature vectors that indicate speech characteristics. A feature vector can be received for each of multiple speech frames, where each speech frame represents, for example, 10 milliseconds of speech. The speech data and the candidate transcription can be received at a distributed computing system.

A phonetic representation for the candidate transcription is obtained (804). The phonetic representation can be a sequence of context-independent phones.

Multiple test sequences are extracted from the phonetic representation (806). The multiple test sequences are extracted for a particular phone in the phonetic representation, and each of the multiple test sequences include a different set of contextual phones surrounding the particular phone.

For example, each of the test sequences can be an M-phone, with a different integer value of M, as described above. The extracted test sequences can include at least, for example, a first sequence that includes one contextual phone before the particular phone and/or one contextual phone after the particular phone, a second sequence that includes two contextual phones before the particular phone and/or two contextual phones after the particular phone, and a third sequence that includes three contextual phones before the particular phone and/or three contextual phones after the particular phone. Each of the test sequences can be sequences of consecutive phones in the phonetic representation.

One or more asymmetric test sequences that include asymmetric numbers of contextual phones before and after the particular phone can be extracted. In addition, one or more symmetric test sequences that include symmetric numbers of contextual phones before and after the particular phone can be extracted. Each of the symmetric test sequences can include fewer contextual phones than each of the one or more asymmetric test sequences. In other words, when backing off from a maximal order M-phone to generate the back-off M-phones, contextual phones can be removed from only the side of the particular phone that includes the most contextual phones. Contextual phones can be removed from one side until a symmetric number of phones about the particular phone are present, and then contextual phones can then be omitted, or backed-off, from both sides of the contextual phone.

In some implementations, at least five test sequences are extracted. The at least five test sequences include test sequences that respectively include any contextual phones occurring within one, two, three, four, or five contextual positions before and after the particular phone. In the test sequences, contextual positions that do not include a contextual phone can be indicated as vacant.

Data indicating that an acoustic model includes data corresponding to one or more of the multiple test sequences is received (808). To receive the data, a request identifying each of the multiple test sequences can be sent. Data from the acoustic model can be received for each of the one or more test sequences recognized by the acoustic model. The acoustic model data that is received for a test sequence, if the data exists in the model, can be a GMM associated with the particular HMM state and phonetic context for that test sequence.

In some implementations, data for the test sequences is obtained from a distributed associative array. To obtain data from the distributed associative array, a partitioning key can be identified based on a sequence of phones that occurs in each of the multiple test sequences. For example, the partitioning key for a test sequence can be based on the central triphone of the test sequence. The same partitioning function used to train the acoustic model can be used to access data from the distributed associative array. A partition of the distributed associative array can be identified based on the partitioning key. In some implementations, a server module is that to which the partitioning key is assigned is determined. The data corresponding to the multiple test sequences can be obtained from the identified partition, or from the identified server module to which the partitioning key is assigned.

From among the one or more test sequences for which the acoustic model includes data, the test sequence that includes the highest number of contextual phones is selected (810). In other words, the longest test sequence that is recognized by the acoustic model is selected. The selected test sequence can be a test sequence that includes a predetermined maximum number of contextual phones, for example, the maximal order M-phone of the multiple test sequences. In some instances, however, one of the test sequences that includes fewer than the predetermined maximum number of contextual phones is selected. When portions of the process 800 are repeated to evaluate different phones of the phonetic representation, the test sequences selected for the different phones can have different numbers of contextual phones surrounding their respective central phones.

Data from the acoustic model corresponding to the selected test sequence is accessed (812). The accessed data can include parameters that define a Gaussian mixture model (GMM), for example, a GMM corresponding to a central phone of the selected test sequence. The GMM can define an output distribution for an HMM state of the particular phone, the output distribution being conditioned on the particular sequence of contextual phones included in the selected test sequence. The accessed data can be the received data indicating that an acoustic model includes data corresponding to one or more of the multiple test sequences. Accessing the data can include accessing the data from a distributed associative array, as described above.

A score for the candidate transcription is generated based on the data from the acoustic model that corresponds to the selected test sequence (814). The score can be a confidence score or probability measure that indicates a likelihood that the candidate transcription is an accurate transcription for the speech data. The score can indicate that a particular portion of the candidate transcription is correct, where the particular portion is the particular phone or a sub-phone component, such as one of several HMM states used to model the particular phone.

When the selected test sequence includes fewer than the predetermined maximum number of contextual phones, a penalty can be determined. A first score, such as a confidence score or probability measure, can be adjusted based on the penalty. Compared to the first score, the adjusted score can indicate a lower likelihood or confidence that the candidate transcription is an accurate transcription for the speech data. The magnitude of the penalty can be determined based on a difference between the number of contextual phones in the selected test sequence and the predetermined maximum number of phones. For example, where the predetermined maximum number of contextual phones is 3 or higher, the penalty for a test sequence that includes two contextual phones before or after the particular phone can be less than the penalty for a test sequence that includes only one contextual phone before or after the particular phone.

In some implementations, generating the score for the candidate transcription includes adjusting a score assigned to the candidate transcription using a different acoustic model, such as an acoustic model that uses a fixed length of phonetic context or an acoustic model that does not rely on phonetic context.

The process 800 can be used to evaluate multiple phones in the phonetic sequence. For example, the process 800 can include extracting multiple second test sequences can from the phonetic representation for a second phone that is different from particular phone. Each of the multiple second test sequences including a different set of contextual phones surrounding the second phone. Data indicating that the acoustic model includes one or more of the multiple second test sequences is received. From among the one or more second test sequences for which the acoustic model includes data, the second test sequence that includes the highest number of contextual phones is selected. Data from the acoustic model corresponding to the selected second test sequence is accessed. The score that is generated for the candidate transcription can be based on the data from the acoustic model that corresponds to selected second test sequence as well as the data from the acoustic model that corresponds to the other selected test sequence. In addition, or as an alternative, a score for the second phone, or an HMM state of the second phone is generated.

The process 800 can be repeated for multiple candidate transcriptions, and the scores generated for each candidate transcription can be used to rank or re-rank the candidate transcriptions according to a likelihood or confidence that the candidate transcriptions are correct transcriptions for the speech data.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A system comprising:
   one or more computers and one or more storage devices
      storing instructions that are operable, when executed by the one or more computers, to cause the one or more computers to perform operations comprising:
receiving speech data and data indicating a candidate transcription for the speech data;
accessing a phonetic representation for the candidate transcription;
extracting, from the phonetic representation, multiple test sequences for a particular phone in the phonetic representation, each of the multiple test sequences including a different set of contextual phones surrounding the particular phone;
receiving data indicating that an acoustic model includes data corresponding to one or more of the multiple test sequences;
selecting, from among the one or more test sequences for which the acoustic model includes data, the test sequence that includes the highest number of contextual phones, the selected test sequence including fewer than a predetermined maximum number of contextual phones;
accessing data from the acoustic model corresponding to the selected test sequence; and
generating a score for the candidate transcription based on the accessed data from the acoustic model that corresponds to the selected test sequence, wherein generating the score comprises:
determining a penalty based on the selected test sequence including fewer than the predetermined maximum number of contextual phones; and
adjusting a first score for the candidate transcription based on the penalty to generate an adjusted score, the adjusted score indicating a lower likelihood than the first score that the candidate transcription is an accurate transcription for the speech data.

2. The system of claim 1, wherein determining the penalty based on the selected test sequence including fewer than the predetermined maximum number of contextual phones comprises determining a magnitude of the penalty based on a difference between a number of contextual phones in the selected test sequence and the predetermined maximum number of contextual phones.

3. The system of claim 1, wherein extracting multiple test sequences for the particular phone comprises extracting one or more asymmetric test sequences that include asymmetric numbers of contextual phones before and after the particular phone.

4. The system of claim 3, wherein extracting multiple test sequences for the particular phone comprises extracting one or more symmetric test sequences that include symmetric numbers of contextual phones before and after the particular phone, each of the symmetric test sequences each including fewer contextual phones than each of the one or more asymmetric test sequences.

5. The system of claim 1, wherein extracting multiple test sequences for the particular phone comprises extracting at least:
a first sequence that includes one contextual phone before the particular phone or one contextual phone after the particular phone,
a second sequence that includes two contextual phones before the particular phone or two contextual phones after the particular phone, and
a third sequence that includes three contextual phones before the particular phone or three contextual phones after the particular phone.

6. The system of claim 1, wherein extracting multiple test sequences for the particular phone comprises extracting at least five test sequences, where the at least five test sequences respectively include any contextual phones occurring within one, two, three, four, or five contextual positions before and after the particular phone.

7. The system of claim 1, wherein receiving data indicating that the acoustic model includes data for the one or more of the multiple test sequences comprises:
requesting, for each of the test sequences, data from the acoustic model that corresponds to the test sequence;
receiving data from the acoustic model corresponding to each of the one or more test sequences for which data is present in the acoustic model; and
determining that the one or more test sequences are recognized by the model based on receiving the data corresponding to the one or more test sequences.

8. The system of claim 1, wherein accessing the data from the acoustic model corresponding to the selected test sequence comprises:
identifying a partitioning key based on a sequence of phones that occurs in each of the multiple test sequences;
identifying a partition of a distributed associative array that corresponds to the partitioning key; and
obtaining, from the identified partition, data corresponding to each of the multiple test sequences for which the acoustic model includes data.

9. The system of claim 1, wherein accessing the data from the acoustic model corresponding to the selected test sequence comprises accessing data that describe a Gaussian mixture model corresponding to a central phone of the selected test sequence.

10. The system of claim 1, wherein accessing the phonetic representation for the transcription comprises accessing a phonetic representation comprising context-independent phones.

11. The system of claim 1, wherein receiving the speech data comprises receiving feature vectors that indicate speech characteristics.

12. The system of claim 1, wherein generating the score for the candidate transcription based on the accessed data from the acoustic model that corresponds to the selected test sequence comprises adjusting a score assigned to the candidate transcription using a different acoustic model.

13. The system of claim 1, wherein the operations further comprise:
extracting, from the phonetic representation, multiple second test sequences for a second phone in the phonetic representation that is different from the particular phone, each of the multiple second test sequences including a different set of contextual phones surrounding the second phone;
receiving data indicating that the acoustic model includes data for one or more of the multiple second test sequences; and
selecting, from among the one or more second test sequences for which the acoustic model includes data, the second test sequence that includes the highest number of contextual phones; and
wherein generating the score for the candidate transcription comprises generating the score for the candidate transcription based on the data from the acoustic model that corresponds to the selected test sequence and the data from the acoustic model that corresponds to selected second test sequence.

14. A computer-implemented method, comprising:
receiving speech data and data identifying a candidate transcription for the speech data;

accessing a phonetic representation for the candidate transcription;

extracting, from the phonetic representation, multiple test sequences for a particular phone in the phonetic representation, each of the multiple test sequences including a different set of contextual phones surrounding the particular phone;

determining that an acoustic model includes data corresponding to one or more of the multiple test sequences;

selecting, from among the one or more test sequences for which the acoustic model includes data, the test sequence that includes the highest number of contextual phones, the selected test sequence including fewer than a predetermined maximum number of contextual phones;

accessing data from the acoustic model corresponding to the selected test sequence; and generating a score for the candidate transcription based on the accessed data from the acoustic model that corresponds to the selected test sequence, wherein generating the score comprises:

determining a penalty based on the selected test sequence including fewer than the predetermined maximum number of contextual phones; and adjusting a first score for the candidate transcription based on the penalty to generate an adjusted score, the adjusted score indicating a lower likelihood than the first score that the candidate transcription is an accurate transcription for the speech data.

15. The computer-implemented method of claim 14, wherein determining the penalty based on the selected test sequence including fewer than the predetermined maximum number of contextual phones comprises determining a magnitude of the penalty based on a difference between a number of contextual phones in the selected test sequence and the predetermined maximum number of contextual phones.

16. The computer-implemented method of claim 14, wherein extracting multiple test sequences for the particular phone comprises extracting one or more asymmetric test sequences that include asymmetric numbers of contextual phones before and after the particular phone.

17. The computer-implemented method of claim 16, wherein extracting multiple test sequences for the particular phone comprises extracting one or more symmetric test sequences that include symmetric numbers of contextual phones before and after the particular phone, each of the symmetric test sequences each including fewer contextual phones than each of the one or more asymmetric test sequences.

18. A non-transitory computer storage medium encoded with a computer program, the program comprising instructions that when executed by one or more computers cause the one or more computers to perform operations comprising:

receiving speech data and data identifying a candidate transcription for the speech data;

accessing a phonetic representation for the candidate transcription;

extracting, from the phonetic representation, multiple test sequences for a particular phone in the phonetic representation, each of the multiple test sequences including a different set of contextual phones surrounding the particular phone;

determining that an acoustic model includes data corresponding to one or more of the multiple test sequences;

selecting, from among the one or more test sequences for which the acoustic model includes data, the test sequence that includes the highest number of contextual phones, the selected test sequence including fewer than a predetermined maximum number of contextual phones;

accessing data from the acoustic model corresponding to the selected test sequence; and generating a score for the candidate transcription based on the accessed data from the acoustic model that corresponds to the selected test sequence, wherein generating the score comprises:

determining a penalty based on the selected test sequence including fewer than the predetermined maximum number of contextual phones; and adjusting a first score for the candidate transcription based on the penalty to generate an adjusted score, the adjusted score indicating a lower likelihood than the first score that the candidate transcription is an accurate transcription for the speech data.

* * * * *